US006557171B1

(12) United States Patent
Sonoda et al.

(10) Patent No.: US 6,557,171 B1
(45) Date of Patent: Apr. 29, 2003

(54) DIGITAL TV BROADCAST SENDING APPARATUS, DIGITAL TV BROADCAST RECEIVING APPARATUS, AND DIGITAL TV BROADCAST SENDING / RECEIVING SYSTEM WHICH FACILITATE PRESELECTION OF TV PROGRAMS, AND COMPUTER READABLE RECORDING MEDIUM STORING A PROGRAM FOR ACHIEVING A FUNCTION OF THE DIGITAL TV BROADCAST RECEIVING APPARATUS

(75) Inventors: Yasuyuki Sonoda, Kyoto (JP); Tatsuya Shimoji, Neyagawa (JP); Masahiro Oashi, Kyotanabe (JP); Kazuo Okamura, Hirakata (JP); Yoshihiro Mimura, Hirakata (JP); Naoya Takao, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/241,339

(22) Filed: Feb. 1, 1999

(30) Foreign Application Priority Data

Feb. 2, 1998 (JP) ............................................ 10-020585

(51) Int. Cl.[7] .............................. H04H 7/16; H04H 7/08
(52) U.S. Cl. ......................... 725/136; 725/138; 725/139
(58) Field of Search ............................... 725/39, 46, 50, 725/58, 86, 87, 114–117, 138, 54, 135, 136, 137, 141, 139

(56) References Cited

U.S. PATENT DOCUMENTS

| | | | | |
|---|---|---|---|---|
| 5,585,838 A | * | 12/1996 | Lawler et al. ................. | 348/13 |
| 5,686,954 A | * | 11/1997 | Yoshinobu et al. ............ | 348/13 |
| 5,737,027 A | * | 4/1998 | Bertram et al. ............. | 348/563 |
| 6,181,335 B1 | * | 1/2001 | Hendricks et al. .......... | 345/328 |
| 6,263,501 B1 | * | 7/2001 | Schein et al. ................. | 725/39 |
| 6,298,482 B1 | * | 10/2001 | Seidman et al. ............. | 725/101 |
| 6,353,930 B1 | * | 3/2002 | Shimoji et al. .............. | 725/110 |
| 6,408,435 B1 | | 6/2002 | Sato | |
| 6,408,437 B1 | * | 6/2002 | Hendricks et al. .......... | 725/132 |
| 6,419,137 B1 | * | 7/2002 | Marshall et al. .............. | 225/41 |
| 6,426,779 B1 | * | 7/2002 | Noguchi et al. ............. | 348/569 |
| 6,449,653 B2 | * | 9/2002 | Klemets et al. ............. | 709/231 |
| 6,460,179 B1 | * | 10/2002 | Kretz et al. .................... | 725/37 |

FOREIGN PATENT DOCUMENTS

| JP | 9298775 | 11/1997 |
|---|---|---|
| WO | 9629701 | 9/1996 |

OTHER PUBLICATIONS

"Basic Function of Multimedia Information Broadcasting Service," Journal of Television Engineers of Japan, vol. 49, No. 3, Mar. 20, 1995, pp. 336–343 (with partial translation).
"Multimedia Services Through Broadcasting," Proceedings of the 1994 IEICE Fall Conference, Sep. 26, 1994, pp. 633–634 (with partial translation).

* cited by examiner

Primary Examiner—John Miller
Assistant Examiner—Annan Q. Shang

(57) ABSTRACT

A digital broadcast sending/receiving system includes a digital broadcast sending apparatus and a digital broadcast receiving apparatus. The digital broadcast sending apparatus multiplexes the audio data and video data of a broadcast program into the transport stream together with preselection control information which controls preselection information image facilitating program preselection, and sends the transport stream to the digital broadcast receiving apparatus. On receiving the transport stream, the digital broadcast receiving apparatus extracts the preselection control information, and reproduces a preselection screen on a display in which the preselection information image is superimposed on the video image of the broadcast program. The digital broadcast receiving apparatus receives from the viewer specification of a program to be preselected. The digital broadcast receiving apparatus stores information on the preselected program, and reproduces the preselected program in accordance with the stored information.

31 Claims, 17 Drawing Sheets

FIG. 2
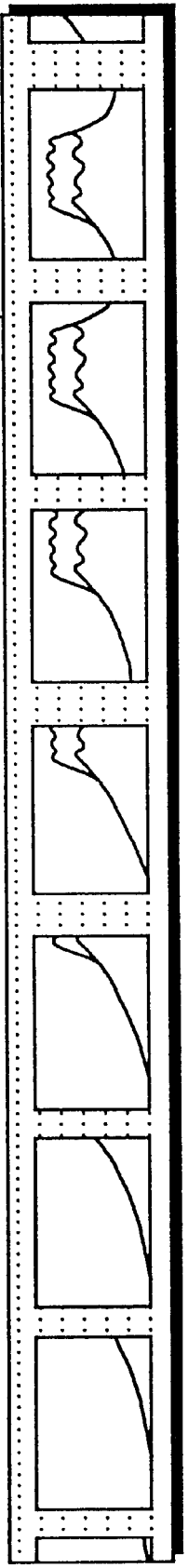
PRESENTATION ID=3 — 201
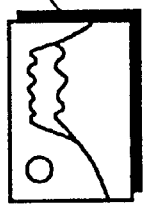
PRESENTATION ID=7 — 202

FIG. 3

301 PROGRAM SCHEDULE INFORMATION

| origonal network _id | transport stream_id | service _id | event_id | start_time | duration | PRESENTATION ID | | PCI ID |
|---|---|---|---|---|---|---|---|---|
| | | | | | | video | audio | |
| 8 | 3 | 5 | 10 | 1999/1/1 12:00:00 | 00:05:00 | 3,7 | 4 | 1 |
| 8 | 2 | 9 | 38 | 1999/1/1 20:00:00 | 01:00:00 | 10 | 20 | — |
| 8 | 2 | 9 | 48 | 1999/1/8 20:00:00 | 01:00:00 | 11 | 21 | — |

FIG. 4

401 PCI (Preselection Control Information)

PCI ID=1

Screen Element Information {

| | | | | | | |
|---|---|---|---|---|---|---|
| 1 | TITLE | (10,10) | (200,80) | DISPLAYED | TEXT | JAPAN TRAVELOGUE |
| 2 | BUTTON1 | (320,300) | (30,30) | DISPLAYED | BITMAP | 1 |
| 3 | BUTTON2 | (320,340) | (30,30) | DISPLAYED | BITMAP | 2 |
| 4 | BUTTON3 | (320,380) | (30,30) | DISPLAYED | BITMAP | 3 |
| 5 | REGIS-TRATION | (50,150) | (500,100) | NOT-DISPLAYED | TEXT | PRESELECTION REGISTERED |
| 6 | EXPLA-NATION | (360,300) | (200,110) | DISPLAYED | TEXT | PRESELECT EPISODE 1<br>PRESELECT EPISODE 2<br>PRESELECT ALL EPISODES |

411  412  413  414  415  416  417

}

Program Preselection and Manipulation Control Information {
    push 1_key {
        preselect               8,2,9,38
        change_visibility    5
        change_presentation  7
    } push 2_key {
        preselect               8,2,9,48
        change_visibility    5
    } push 3_key {
        preselect               8,2,9,38
        preselect               8,2,9,48
        change_visibility    5
        change_presentation  7
    }
}

FIG. 6

601 NIT (PID:0x0010)

| original_network_id | transport_stream_id |
|---|---|
| . . . | . . . |
| 8 | 2 |
| . . . | . . . |
| 8 | 3 |
| . . . | . . . |

FIG. 7

701 SDT (PID:0x0011)

| service_id | descriptor |
|---|---|
| . . . | . . . |
| 5 | SERVICE NAME, ETC. |
| . . . | . . . |

FIG. 8

801 EIT (PID:0x0012)

| event_id | start_time | duration |
|---|---|---|
| . . . | . . . | . . . |
| 10 | 1999/1/1 12:00:00 | 00:05:00 |
| . . . | . . . | . . . |

FIG. 9

901 PAT (PID:0x0000)

| program_number | program_map_PID |
|---|---|
| . . . | . . . |
| 5 | 30 |
| . . . | . . . |

FIG. 10

1001 PMT (PID:0x0030)

| type | PID |
|---|---|
| video | 50 |
| video | 51 |
| audio | 52 |
| PCI | 60 |

FIG. 13

1301 SDT(PID:0x0011)

| service_id | descriptor |
|---|---|
| ... | ... |
| 9 | SERVICE NAME,ETC. |
| ... | ... |

FIG. 14

1401 EIT(PID:0x0012)

| event_id | start_time | duration |
|---|---|---|
| ... | ... | ... |
| 38 | 1999/1/1 20:00:00 | 01:00:00 |
| ... | ... | ... |

FIG. 15

1501 PAT(PID:0x0000)

| program_number | program_map_PID |
|---|---|
| ... | ... |
| 9 | 70 |
| ... | ... |

FIG. 16

1601 PMT(PID:0x0070)

| type | PID |
|---|---|
| video | 80 |
| audio | 81 |

FIG. 17

1701 PCI (Preselection Control Information)

| PCI ID=1 | | | | | |
|---|---|---|---|---|---|
| Screen Element Information { | | | | | |
| 1 | TITLE | (10,10) | (200,80) | DISPLAYED | TEXT | JAPAN TRAVELOGUE |
| 2 | BUTTON1 | (320,300) | (30,30) | DISPLAYED | BITMAP | 1 |
| 3 | BUTTON2 | (320,340) | (30,30) | DISPLAYED | BITMAP | 2 |
| 4 | BUTTON3 | (320,380) | (30,30) | DISPLAYED | BITMAP | 3 |
| 5 | REGIS-TRATION | (50,150) | (500,100) | NOT-DISPLAYED | TEXT | PRESELECTION REGISTERED |
| 6 | EXPLA-NATION | (360,300) | (200,110) | DISPLAYED | TEXT | PRESELECT EPISODE 1 PRESELECT EPISODE 2 PRESELECT ALL EPISODES |

1707 brackets the Screen Element Information table.

}
Program Preselection and Manipulation Control Information {
　　　　push 1_key{　　　　　　　　　　　　　　　　　1704
　　　　　　＼1708　　preselect　　　　　　8,2,9,38
　　　　　　　　　　　change_visibility　　5　　　1711
　　　　　　　　　　　change_presentation　0x0051
　　　　}　　　　　　　　　　　　　　　　　　　　1702 push 2_key{　　　　　　　　　　　　　　　　　1705
　　　　　　＼1709　　preselect　　　　　　8,2,9,48
　　　　　　　　　　　change_visibility　　5
　　　　} push 3_key{
　　　　　　＼1710　　preselect　　　　　　8,2,9,38  ⎤
　　　　　　　　　　　preselect　　　　　　8,2,9,48  ⎦1706
　　　　　　　　　　　change_visibility　　5
　　　　　　　　　　　change_presentation　0x0051
　　　　}　　　　　　　　　　　　　　　　　　　　1703
}

DIGITAL TV BROADCAST SENDING APPARATUS, DIGITAL TV BROADCAST RECEIVING APPARATUS, AND DIGITAL TV BROADCAST SENDING / RECEIVING SYSTEM WHICH FACILITATE PRESELECTION OF TV PROGRAMS, AND COMPUTER READABLE RECORDING MEDIUM STORING A PROGRAM FOR ACHIEVING A FUNCTION OF THE DIGITAL TV BROADCAST RECEIVING APPARATUS

BACKGROUND OF THE INVENTION (1) Field of the Invention

This invention relates to preselection of TV programs in a digital TV broadcast system.

(2) Description of the Prior Art

There have been known several methods for preselecting TV programs for recording. In one method, viewers input recording dates, program start/end times, channel numbers or the like using a remote controller, obtaining these pieces of information from a printed program schedule. Recently, another method has become popular in which viewers input a sequence of numerals called "G-code" for preselecting programs. This method is thought to be easier than the first method.

In digital satellite broadcasting, the third method is available. The third method provides on-screen preselection of recording-target programs. In this method, EPG (Electronic Program Guide) being a screen used by viewers to preselect a desired program is displayed on the TV screen.

However, each of the above methods has problems. With the first method, viewers usually input data which is obtained from a printed program schedule. As a result, a printed source or the like is required to input information. With the second method, it is required to use recording apparatuses that have a function for decoding the G-codes.

With the third method, viewing the EPG displayed on the TV screen, viewers can easily preselect TV programs to be recorded. However, the EPG screen which is transmitted from the broadcasting station is monotonous. The EPG is displayed on the receiving apparatuses irrelevant to the contents of the currently displayed programs. Furthermore, it is impossible with this method to preselect a plurality of TV programs at a time.

SUMMARY OF THE INVENTION

It is therefore the first object of the present invention to provide a digital broadcast sending apparatus for sending a promotional program on which diversified screens are displayed in relation to preselection manipulations performed by the viewers. It is the second object of this invention to provide a digital broadcast receiving apparatus with which the viewers can preselect programs while watching the promotional program. It is the third object of this invention to provide a digital broadcast sending/receiving system in which the above two objects are both achieved.

The first object is fulfilled by a digital broadcast sending apparatus which sends a transport stream to a digital broadcast receiving apparatus, comprising: a presentation data storage unit for storing a plurality of pieces of presentation data of a broadcast program, where each of the plurality of pieces of presentation data is either of video data and audio data; a preselection control information storage unit for storing preselection control information which is used by the digital broadcast receiving apparatus to receive instructions from a viewer concerning preselection of object programs, the preselection control information including: a first script which specifies a manipulation of the viewer performed to preselect an object program; and a second script which includes program identification information specifying the object program corresponding to the manipulation specified in the first script and includes an instruction to perform a process of preselecting the specified object program when the viewer performs the manipulation; a program schedule information storage unit for storing program schedule information which includes information used for identifying the broadcast program, includes broadcast time information of the broadcast program, and shows a relationship between the broadcast program and the preselection control information; a multiplexing control unit for referring to the program schedule information, reading the plurality of pieces of presentation data from the presentation data storage unit, and multiplexing the read plurality of pieces of presentation data into the transport stream during a transmission period which is determined based on the broadcast time information, and repeatedly reading the preselection control information specified in the program schedule information from the preselection control information storage unit and multiplexing the read preselection control information into the transport stream during the transmission period; and a sending unit for sending the transport stream in which the read plurality of pieces of presentation data and the read preselection control information are multiplexed.

With the above-stated construction, it is possible for a program supplier to send a broadcast program using the digital broadcast sending apparatus, where programs specified in the second script can be preselected when the viewer performs a manipulation specified in the first script while the broadcast program is broadcast.

In the above-described digital broadcast sending apparatus, the preselection control information may further include a third script which specifies that when an object program is preselected, either a piece of presentation data currently reproduced is changed to another piece of presentation data or graphics data is reproduced, the graphics data being included in the preselection control information.

With the above-stated construction, the viewer can recognize in diversified ways that a preselection of program has been registered.

In the above-described digital broadcast sending apparatus, the first script may further include a manipulation object which is superimposed on an original image of a piece of presentation data of video data reproduced on a display of the digital broadcast receiving apparatus.

With the above-stated construction, the manipulation object is superimposed on the original image of the broadcast program. This facilitates the program preselection since a program is preselected when the viewer presses a button corresponding to the program on the remote controller, for example.

In the above-described digital broadcast sending apparatus, the second script may specify a plurality of object programs.

With the above-stated construction, the viewer can preselect a plurality of programs with one manipulation for the preselection.

In the above-described digital broadcast sending apparatus, the presentation data storage unit may further store another plurality of presentation data of the object program specified in the second script, and the program schedule information storage unit includes the program identification information included in the second script and includes broadcast time information of the object program specified in the second script, and the digital broadcast sending apparatus further comprises: a system table generating unit for generating an Event Information Table (EIT) which shows the broadcast time information of the object program, and the multiplexing control unit starts, a predetermined time before a broadcast start of the object program, repeatedly multiplexing the generated EIT into the transport stream, reads the other plurality of presentation data of the object program from the presentation data storage unit, and multiplexes the presentation data into the transport stream during the transmission period.

With the above-stated construction, the digital broadcast receiving apparatus can reproduce the preselected program.

In the above-described digital broadcast sending apparatus, the second script may include a set of original_network_id, transport_stream_id, service_id, and event_id for use of specifying object programs, and the system table generating unit generates system tables whereby the digital broadcast receiving apparatus extracts the other plurality of presentation data of the object program identified by the set of original_network_id, transport_stream_id, service_id, and event_id, and the multiplexing control unit starts, a predetermined time before a broadcast start of the object program, repeatedly multiplexing the generated system tables into the transport stream during the transmission period.

With the above-stated construction, the digital broadcast receiving apparatus is assured to reproduce the preselected programs by referring to the system tables.

The first object is also fulfilled by a digital broadcast sending apparatus which sends a transport stream to a digital broadcast receiving apparatus, comprising: a presentation data storage unit for storing a plurality of pieces of presentation data of a broadcast program, where each of the plurality of pieces of presentation data is either of video data and audio data; a preselection control information storage unit for storing preselection control information which is used by the digital broadcast receiving apparatus to receive instructions from a viewer concerning preselection of object programs, the preselection control information including: graphics information which includes graphics data to be superimposed on an original image of a piece of presentation data of video data reproduced on a display of the digital broadcast receiving apparatus, the graphics information also specifying an initial display state of the graphics data; object program identification information which is used to identify object programs preselected by the viewer; and a change instruction for instructing to change the initial display state of the graphics data to another display state when a preselection of the object program is complete; a program schedule information storage unit for storing program schedule information which includes information used for identifying the broadcast program, includes broadcast time information of the broadcast program, and shows a relationship between the broadcast program and the preselection control information; a multiplexing control unit for referring to the program schedule information, reading the plurality of pieces of presentation data from the presentation data storage unit, and multiplexing the read plurality of pieces of presentation data into the transport stream during a transmission period which is determined based on the broadcast time information, and repeatedly reading the preselection control information specified in the program schedule information from the preselection control information storage unit and multiplexing the read preselection control information into the transport stream during the transmission period; and a sending unit for sending the transport stream in which the read plurality of pieces of presentation data and the read preselection control information are multiplexed.

With the above-stated construction, it is possible for a program supplier to send a broadcast program which is arranged to change the display state of the graphics data from the initial one to another one when a program preselection is completed.

In the above-described digital broadcast sending apparatus, the preselection control information may further include a script which specifies that when an object program is preselected, a piece of presentation data currently reproduced is changed to another piece of presentation data.

With the above-stated construction, it is possible to change the background video image or voice when a program preselection is completed, providing more diversified preselection screen images.

In the above-described digital broadcast sending apparatus, the preselection control information may further include a manipulation object which is to be superimposed on the original image, the program identification information includes a piece of manipulation information which corresponds to the manipulation object and specifies a manipulation performed by the viewer to preselect an object program, and when the viewer performs the manipulation to preselect the object program, the object program is identified through the piece of manipulation information.

With the above-stated construction, it is possible for the viewer watching the broadcast program on the digital broadcast receiving apparatus to easily specify a program to be preselected by specifying a manipulation object on the preselection screen.

The first object is also fulfilled by a digital broadcast sending apparatus which sends a transport stream to a digital broadcast receiving apparatus, comprising: a preselection control information storage unit for storing preselection control information which is used by the digital broadcast receiving apparatus to receive instructions from a viewer concerning preselection of object programs, the preselection control information including: a first script which includes a manipulation object and specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation; a program schedule information storage unit for storing program schedule information which includes broadcast time information of the preselection control information; a multiplexing control unit for referring to the program schedule information, repeatedly reading the preselection control information specified in the program schedule information from the preselection control information storage unit and multiplexing the read preselection control information into the transport stream during a transmission period which is determined based on the broadcast time information; and a sending unit for sending the transport stream in which the read preselection control information is multiplexed.

With the above-stated construction, the digital broadcast receiving apparatus, on receiving the transport stream, displays only the manipulation object occupying a small area of the screen. The viewer can perform a manipulation for preselecting a program watching the displayed manipulation object.

The above-described digital broadcast receiving apparatus may further comprise: a presentation data storage unit for storing a piece of presentation data of a broadcast program, where the piece of presentation data is either of video data and audio data, where the program schedule information storage unit further stores broadcast time information of the broadcast program, and the multiplexing control unit reads the piece of presentation data from the presentation data storage unit, and multiplexes the read piece of presentation data into the transport stream during the transmission period.

With the above-stated construction, the digital broadcast receiving apparatus can reproduce video data or audio data while presenting the manipulation object.

The second object is fulfilled by a digital broadcast receiving apparatus for receiving a transport stream in which a plurality of pieces of presentation data of a broadcast program and preselection control information are multiplexed, where each of the plurality of pieces of presentation data is either of video data and audio data, and the preselection control information is used for receiving instructions from a viewer concerning preselection of object programs, the digital broadcast receiving apparatus comprising: a receiving/extracting unit for receiving the transport stream and extracting the plurality of pieces of presentation data and the preselection control information from the received transport stream, where the preselection control information includes: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation; a display processing unit for displaying an original image on an external display based on a piece or presentation data being video data extracted by the receiving/extracting unit; a preselection receiving unit for receiving a manipulation performed by the viewer; and a script interpreting/executing unit for interpreting the first script and executing the second script when the manipulation received by the preselection receiving unit matches contents of the first script.

With the above-stated construction, it is possible for the viewer watching the broadcast program on the digital broadcast receiving apparatus to easily specify a program to be preselected by specifying a manipulation object on the preselection screen, watching diversified images of the broadcast program.

In the above-described digital broadcast receiving apparatus, the preselection control information may further include a third script which specifies that when an object program is preselected, either a piece of presentation data currently reproduced is changed to another piece of presentation data or graphics data is reproduced, the graphics data being included in the preselection control information, the script interpreting/executing unit includes: a third script interpreting unit for interpreting the third script; and an extraction control unit for: instructing the receiving/extracting unit to stop extracting a current piece of presentation data and start extracting another piece of presentation data when the interpreted third script specifies that a piece of presentation data currently reproduced is changed to another piece of presentation data; and extracting the graphics data from the preselection control information and instructing the display processing unit to display the extracted graphics data when the interpreted third script specifies that the graphics data is reproduced, where the graphics data is superimposed on the original image when the graphics data is displayed.

With the above-stated construction, the viewer is assured to be notified that the program has been preselected.

In the above-described digital broadcast receiving apparatus, the first script may further include a manipulation object which is superimposed on the original image.

With the above-stated construction, the manipulation object is superimposed on the original image of the broadcast program. This facilitates the program preselection since a program is preselected when the viewer presses a button corresponding to the program on the remote controller, for example.

In the above-described digital broadcast receiving apparatus, the second script may specify a plurality of object programs, and the digital broadcast receiving apparatus further comprises: a program identification information storage unit for, when the preselection receiving unit receives a manipulation performed by the viewer, storing program identification information which specifies all of the plurality of object programs recognized by the script interpreting/executing unit through the execution of the second script.

With the above-stated construction, the viewer can preselect a plurality of programs with one manipulation for the preselection.

In the above-described digital broadcast receiving apparatus, an Event Information Table (EIT) showing a broadcast start time and a broadcast duration of the object program may be multiplexed in the transport stream, and presentation data of the object program is also multiplexed in the transport stream, the digital broadcast receiving apparatus further comprises: a timer for clocking time; and a program identification information storage unit for storing the program identification information which is obtained by the script interpreting/executing unit, where the script interpreting/executing unit instructs the receiving/extracting unit to extract the EIT which shows the object program identified through the program identification information stored in the program identification information storage unit, refers to the timer for the current time, and instructs the receiving/extracting unit to extract the presentation data of the object program shown in the EIT either when the broadcast start time written in the EIT matches the current time or when the current time is in the broadcast duration starting from the broadcast start time.

With the above-stated construction, the preselected program is reproduced when the broadcast start time has been reached. When a program is preselected during the broadcast period of the program, the preselection has the same function as selection and the broadcast program is changed to the selected program immediately.

In the above-described digital broadcast receiving apparatus, system tables may be multiplexed in the transport stream, and the second script includes a set of original_network_id, transport_stream_id, service_id, and event_id for use of specifying object programs, and the system tables are used to extract object programs specified by the set of original_network_id, transport_stream_id, service_id, and event_id, and the script interpreting/executing unit instructs the receiving/extracting unit to extract the system tables, refers to the extracted system tables and the EIT to control the receiving/extracting unit.

With the above-stated construction, it is ensured that the preselected program is extracted from the transport stream to be reproduced.

The second object is also fulfilled by a computer-readable recording medium storing a program which allows a computer to function as a digital broadcast receiving apparatus for receiving a transport stream in which a plurality of pieces of presentation data of a broadcast program and preselection control information are multiplexed, where each of the plurality of pieces of presentation data is either of video data and audio data, and the preselection control information is used for receiving instructions from a viewer concerning preselection of object programs, the digital broadcast receiving apparatus comprising: the digital broadcast receiving apparatus comprising: a receiving/extracting unit for receiving the transport stream and extracting the plurality of pieces of presentation data and the preselection control information from the received transport stream, where the preselection control information includes: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation; a display processing unit for displaying an original image on an external display based on a piece of presentation data being video data extracted by the receiving/extracting unit; a preselection receiving unit for receiving a manipulation performed by the viewer; and a script interpreting/executing unit for interpreting the first script and executing the second script when the manipulation received by the preselection receiving unit matches contents of the first script.

The second object is also fulfilled by a digital broadcast receiving apparatus for receiving a transport stream in which a plurality of pieces of presentation data of a broadcast program and preselection control information are multiplexed, where each of the plurality of pieces of presentation data is either of video data and audio data, and the preselection control information is used for receiving instructions from a viewer concerning preselection of object programs, the digital broadcast receiving apparatus comprising: a receiving/extracting unit for receiving the transport stream and extracting the plurality of pieces of presentation data and the preselection control information from the received transport stream, where the preselection control information includes: graphics information which includes graphics data to be superimposed on an original image of a piece of presentation data of video data reproduced on the external display, the graphics information also specifying an initial display state of the graphics data; object program identification information which is used to identify object programs preselected by the viewer; and a change instruction for instructing to change the initial display state of the graphics data to another display state when a preselection of the object program is complete; a display processing unit for displaying the original image on an external display based on a piece of presentation data being video data extracted by the receiving/extracting unit; a preselection judging unit for judging whether the viewer has preselected an object program; and a control unit for instructing the display processing unit to display the graphics data so that the graphics data is superimposed on the original image based on the change instruction when the preselection judging unit judges that the viewer has preselected an object program.

With the above-stated construction, it is possible for the viewer to easily specify a program to be preselected watching the broadcast program and to recognize the registration of the preselected program by seeing the change of the preselection screen which is caused by the change of the display state of the graphics data.

In the above-described digital broadcast receiving apparatus, the preselection control information may further include a script which specifies that when an object program is preselected, a piece of presentation data currently reproduced is changed to another piece of presentation data, the control unit includes: a script interpreting unit for interpreting the script; and a presentation data extraction control unit for instructing the receiving/extracting unit to stop extracting a current piece of presentation data and start extracting another piece of presentation data when the preselection judging unit judges that the viewer has preselected an object program.

With the above-stated construction, it is possible to change the background video image or voice when a program preselection is completed, allowing the viewer in a more reliable way to recognize that the preselected program has been registered.

In the above-described digital broadcast receiving apparatus, the preselection control information may further specify a manipulation object which is to be superimposed on the original image, the object program identification information includes a piece of manipulation information which corresponds to the manipulation object and specifies a manipulation performed by the viewer to preselect the object program, and the display processing unit superimposes the manipulation object on the original image displayed on the external display, where the digital broadcast receiving apparatus further comprises: a preselection receiving unit for recognizing a manipulation performed by the viewer; and a program ID storage unit for storing IDs of the object programs identified by the object program identification information.

With the above-stated construction, the manipulation object is superimposed on the original image of the broadcast program. This facilitates the program preselection since a program is preselected when the viewer presses a button corresponding to the program on the remote controller, for example.

The second object is also fulfilled by a digital broadcast receiving apparatus for receiving a transport stream in which preselection control information is multiplexed, where the preselection control information is used for receiving instructions from a viewer concerning preselection of object programs, the digital broadcast receiving apparatus comprising: a receiving/extracting unit for receiving the transport stream and extracting the preselection control information from the received transport stream, where the preselection control information includes: a first script which includes a manipulation object and specifies a manipulation of the viewer performed to preselect an object program; and a second script which includes program identification information specifying the object program corresponding to the manipulation specified in the first script and, includes an instruction to perform a process of preselecting the specified object program when the viewer performs the manipulation; a display processing unit for displaying on the external display the manipulation object included in the extracted first script; a preselection receiving unit for receiving a manipulation performed by the viewer; and a script interpreting/executing unit for interpreting the first script and executing the second script when the manipulation received by the preselection receiving unit matches contents of the first script.

The above-stated construction facilitates the manipulation of the viewer for preselecting programs.

In the above-described digital broadcast receiving apparatus, presentation data of audio data may be multiplexed in the transport stream, the second script may further include an instruction to extract the presentation data when the viewer performs the manipulation, the script interpreting/executing unit may instruct the receiving/extracting unit to extract the presentation data in accordance with the second script, the receiving/extracting unit may extract the presentation data in accordance with the instruction by the script interpreting/executing unit, and the digital broadcast receiving apparatus may further comprise: an audio processing unit for reproducing the presentation data of audio data extracted by the receiving/extracting unit.

With the above-stated construction, it is possible to output the presentation data of audio data when the viewer performs a manipulation to preselect an object program. For example, it is possible to output a voice message "PRESELECTION COMPLETED" to notify the viewer of it.

In the above-described digital broadcast receiving apparatus, presentation data of video data may be multiplexed in the transport stream, the second script may further include an instruction to extract the presentation data when the viewer performs the manipulation, the script interpreting/executing unit may instruct the receiving/extracting unit to extract the presentation data in accordance with the second script, the receiving/extracting unit may extract the presentation data in accordance with the instruction by the script interpreting/executing unit, and the display processing unit may display on the external display the presentation data of video data as a background of the manipulation object.

With the above-stated construction, it is possible to output the presentation data of video data when the viewer performs a manipulation to preselect an object program. For example, it is possible to output a visual message "PRESELECTION COMPLETED" to notify the viewer of it.

In the above-described digital broadcast receiving apparatus, presentation data of audio data of a broadcast program may be multiplexed into the transport stream during a broadcast period of the broadcast program, the receiving/extracting unit may further extract the presentation data from the transport stream, and the digital broadcast receiving apparatus may further comprise: an audio data processing unit for reproducing the extracted presentation data of audio data during the broadcast period of the broadcast program.

With the above-stated construction, it is possible to output a background music while a program is broadcast.

In the above-described digital broadcast receiving apparatus, presentation data of video data of a broadcast program may be multiplexed into the transport stream during a broadcast period of the broadcast program, the receiving/extracting unit may further extract the presentation data from the transport stream, and the display processing unit may display the extracted presentation data of video data during the broadcast period of the broadcast program on the external display as a background image of the manipulation object.

With the above-stated construction, it is possible to display a background image behind the manipulation object.

The third object is fulfilled by a digital broadcast sending/receiving system which includes a digital broadcast sending apparatus and a digital broadcast receiving apparatus, where the digital broadcast sending apparatus sends a transport stream to the digital broadcast receiving apparatus and the digital broadcast receiving apparatus displays a preselection information image on an external display, the digital broadcast sending apparatus comprising: a presentation data storage unit for storing a plurality of pieces of presentation data of a broadcast program, where each of the plurality of pieces of presentation data is either of video data and audio data; a preselection control information storage unit for storing preselection control information which is used by the digital broadcast receiving apparatus to receive instructions from a viewer concerning preselection of object programs, the preselection control information including: A first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation; a program schedule information storage unit for storing program schedule information which includes information used for identifying the broadcast program, includes broadcast time information of the broadcast program, and shows a relationship between the broadcast program and the preselection control information; a multiplexing control unit for referring to the program schedule information, reading the plurality of pieces of presentation data from the presentation data storage unit, and multiplexing the read plurality of pieces of presentation data into the transport stream during a transmission period which is determined based on the broadcast time information, and repeatedly reading the preselection control information specified in the program schedule information from the preselection control information storage unit and multiplexing the read preselection control information into the transport stream during the transmission period; and a sending unit for sending the transport stream in which the read plurality of pieces of presentation data and the read preselection control information are multiplexed, and the digital broadcast receiving apparatus comprising: a receiving/extracting unit for receiving the transport stream and extracting the plurality of pieces of presentation data and the preselection control information from the received transport stream, where the preselection control information includes: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation; a display processing unit for displaying an original image on an external display based on a piece of presentation data being video data extracted by the receiving/extracting unit; a preselection receiving unit for receiving a manipulation performed by the viewer; and a script interpreting/executing unit for interpreting the first script and executing the second script when the manipulation received by the preselection receiving unit matches contents of the first script.

With the above-stated construction, while watching the broadcast program, the viewer can easily preselect programs among the object programs which have previously been provided by the supplier of the broadcast program.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 is a schematic representation of the video data stored in the A/V data storage unit of the above-mentioned embodiment;

FIG. 3 shows an example of the program schedule information stored in the program schedule information storage unit of the above-mentioned embodiment;

FIG. 4 shows preselection control information stored in the preselection control information storage unit of the digital broadcast sending apparatus of the above-mentioned embodiment;

FIG. 6 shows an example of NIT generated by the system table generating unit of the above-mentioned embodiment;

FIG. 7 shows an example of SDT generated by the system table generating unit of the above-mentioned embodiment;

FIG. 8 shows an example of EIT generated by the system table generating unit of the above-mentioned embodiment;

FIG. 9 shows an example of PAT generated by the system table generating unit of the above-mentioned embodiment;

FIG. 10 shows an example of PMT generated by the system table generating unit of the above-mentioned embodiment;

FIG. 13 shows an example of SDT stored in the system table storage unit of the above-mentioned embodiment;

FIG. 14 shows an example of EIT stored in the system table storage unit of the above-mentioned embodiment;

FIG. 15 shows an example of PAT stored in the system table storage unit of the above-mentioned embodiment;

FIG. 16 shows an example of PMT stored in the system table storage unit of the above-mentioned embodiment;

FIG. 17 shows an example of preselection control information stored in the preselection control information storage unit of the digital broadcast receiving apparatus in the above-mentioned embodiment;

DESCRIPTION OF THE PREFERRED EMBODIMENTS

An embodiment of the digital broadcast sending/receiving system of the present invention will be described with reference to the drawings.

Embodiment

Figure 1:
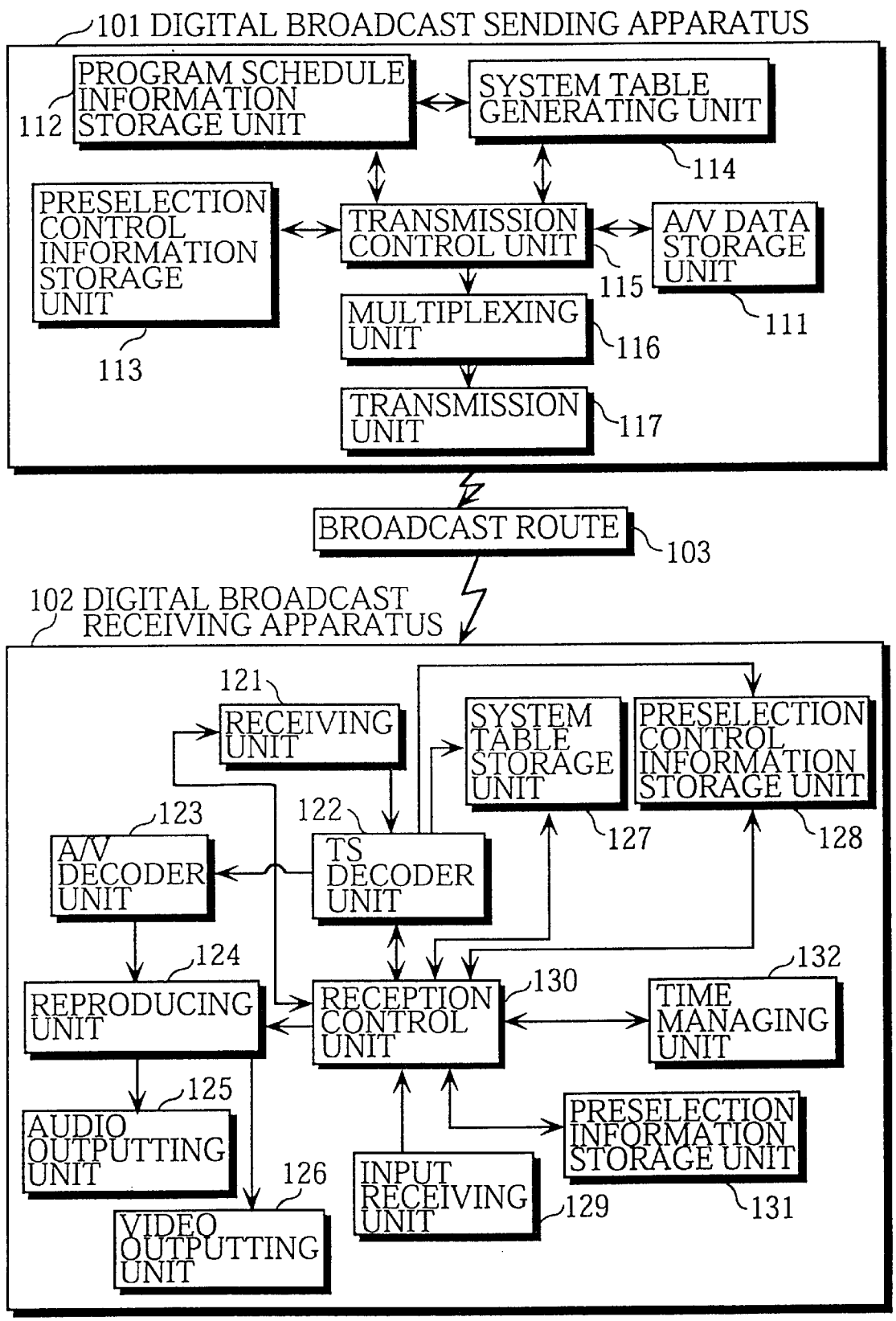
FIG. 1 is a block diagram showing the construction of the digital broadcast sending/receiving system as an embodiment of the present invention.

FIG. 1 is a block diagram showing the construction of the digital broadcast sending/receiving system as the present invention.

The digital broadcast sending/receiving system includes a digital broadcast sending apparatus 101 and a digital broadcast receiving apparatus 102. Transport streams are transmitted from the digital broadcast sending apparatus 101 and sent to the digital broadcast receiving apparatus 102 via a broadcast route 103.

The broadcast route 103 is a route used to transfer the transport streams from the digital broadcast sending apparatus 101 to the digital broadcast receiving apparatus 102, and is achieved by a satellite link, ground wave, or cable.

The digital broadcast sending/receiving system conforms to MPEG2 (Moving Picture Experts Group 2), video standard, system standard, and DVB (Digital Video Broadcasting) standard.

MPEG2 is explained in detail in "Saishin MPEG Kyokasho (Latest MPEG Textbook)" compiled by Multimedia Communications Study Group, ASCII Inc, 1995. The DVB standard is detailed in European Communication Standard 300 468.

Construction of Digital Broadcast Sending Apparatus 101

The digital broadcast sending apparatus 101 includes an A/V (Audio/Video) data storage unit 111, a program schedule information storage unit 112, a preselection control information storage unit 113, a system table generating unit 114, a transmission control unit 115, a multiplexing unit 116, and a transmission unit 117.

The A/V data storage unit 111, being achieved by a hard disc or an optical disc or the like, stores digital data of broadcast programs including a promotional program and preselection-object programs. Each piece of the digital data is called presentation data and has an identification number called presentation ID. The presentation ID may be represented by a file name. The video data may be still-picture data.

FIG. 2 is a schematic representation of presentation data stored in the A/V data storage unit 111. Presentation data 201 with presentation ID "3" in the drawing shows that it is video data. Presentation data 202 with presentation ID "7" is still-picture data. These kinds of data are stored as digital data.

It should be noted here that file names should not necessarily be presentation IDs. For example, a file name may be represented as "3.vid" or "7.img" which is a combination of a presentation ID and an extension, where the extension indicates video data or still-picture data.

Though not shown in the figures, the presentation data stored in the A/V data storage unit 111 also includes audio data with presentation IDs assigned.

The program schedule information storage unit 112, being achieved by a hard disc or an optical disc or the like, stores program schedule information. The program schedule information shows relationships between a promotional program and preselection control information which will be described later, and also shows the programs which are objects of preselection specified in the preselection control information.

FIG. 3 shows an example of the program schedule information. Program schedule information 301 includes a presentation ID column 302 for showing presentation IDs of presentation data of corresponding programs, a preselection control information ID column 303 for storing an ID of preselection control information which is sent together with the presentation data, a start time column 304 for storing a date and time when the program starts, duration column 305 for storing the broadcasting period of the program, an original_network_id column 306, a transport_stream_id column 307, a service_id column 308, and an event_id column 309. The presentation ID column 302 is divided into a "video" column 310 and an "audio" column 311.

The first line of the program schedule information 301 shown in FIG. 3 indicates that a promotional program composed of video data "3" and "7" and audio data "4" is sent together with the preselection control information "1." As understood from this example, it is possible to include a plurality of pieces of presentation data in one program, whether the presentation data is video data or audio data.

The original_network_id, transport_stream_id, service_id, and event_id are stipulated in the DVB standard. One set of these IDs specifies one program.

Also, the "start_time" and "duration" correspond to the broadcast start time and the broadcast period stipulated in the DVB standard as EIT (Event Information Table). The first line of the program schedule information 301 indicates that the promotional program is to be broadcast for five minutes starting at 12:00 on Jan. 1, 1999.

The preselection control information storage unit 113, being achieved by a hard disc or an optical disc or the like, stores preselection control information which is sent together with the presentation data of the promotional program. In the present embodiment, each piece of preselection control information is identified by an identification number called preselection control information ID (PCI ID). The PCI ID may be represented by a file name.

FIG. 4 shows preselection control information (PCI). The PCI 401 has PC ID "1." The PCI 401 is composed of screen element information 402 and program preselection and manipulation control information 403.

The screen element information 402 includes information concerning screen elements which are superimposed on the image of the program.

The first column 411 of the screen element information 402 includes IDs of graphics objects as the screen elements, the IDs being called screen element IDS. The second column 412 includes names of the screen elements. The third column 413 includes the coordinates of the screen elements on the screen, where the origin, or (0,0) of the coordinate system is the upper left endpoint of the screen. The fourth column 414 includes the sizes of the screen elements. The fifth column 415 includes default display states of the screen elements. The sixth column 416 includes the types of the screen elements. The seventh column 417 includes the screen elements which are to be displayed on the screen.

The screen elements with screen element IDs "1," "5" and "6" are of the text box type and are explanatory texts used for the program preselection. Since the initial display state of the screen element "5" named "Registration" is "not displayed," "Preselection Registered" is not displayed initially. The screen elements "2," "3," and "4" named "button 1," "button 2," and "button 3" are of the bit map type and are manipulation objects displayed on the screen of the digital broadcast receiving apparatus 102.

The program selection and manipulation control information 403 includes a set of input manipulation information 424, program identification information 427, and display control information 430 which is related to "button 1," and includes similar set of 425, 428, and 431 and set of 426, 429, and 432 which are respectively related to "button 2" and "button 3."

The input manipulation information 424, 425, and 426 respectively indicate the manipulations of "button 1", "button 2", and "button 3." When a signal corresponding to the manipulation of a button is received, the corresponding programs identified by the program identification information 427, 428, or 429 are preselected.

In the example shown in FIG. 4, the program identification information 427 includes the script "preselect" (the preselect instruction) and identification numbers 8, 2, 9, and 38, which indicates that the program identified by these identification numbers should be preselected. The four identification numbers in this set are respectively the original_network_id, transport_stream_id, service_id, and event_id. Thus, the program identification information 427 specifies a program which is composed of two pieces of presentation data with presentation IDs "10" and "20," as shown in FIG. 3. Similarly, the program identification information 428 specifies a program which is composed of two pieces of presentation data with presentation IDs "11" and "21."

The program identification information 429 specifies the above two programs. That means when a signal corresponding to the input manipulation information 426 is received, the two programs are preselected.

The display control information 430, 431, and 432 include the scripts "change_visibility" and "change presentation." The script "change_visibility" is the displayed/not-displayed change instruction to change the display state of the specified screen element. The script "change_presentation" is the presentation data change instruction to change the presentation data. In the present example, the display control information 430 indicates that the display state of the screen element "5" is to be changed, and that the current presentation data is to be changed to that with the presentation ID "7."

The PCI 401 described above enables viewers to preselect programs (e.g., programs being promoted) while a certain program (e.g., a promotional program) is broadcast, where the relationships between the certain program and other object programs are defined in the program schedule information by the program producer in advance.

The use of the program selection and manipulation control information 403 in the digital broadcast receiving apparatus 102 will be described in detail.

When the viewer presses the button "1" on the remote controller while the promotional program is reproduced, the digital broadcast receiving apparatus 102 receives a signal corresponding to the input manipulation information 424. With this manipulation, the first episode of "Japan Travelogue" which is specified by the program identification information 427 is preselected. Also, in accordance with the display control information 430: the display state of the screen element "5" is changed from "not displayed" to "displayed" so that the screen element "Preselection Registered" is displayed on the screen; and the current presentation data is changed to presentation data with the presentation. ID "7" so that the background image on the screen is changed to that identified by presentation ID "7."

When the viewer presses the button "2" on the remote controller while the promotional program is reproduced, the digital broadcast receiving apparatus 102 receives a signal corresponding to the input manipulation information 425. With this manipulation, the second episode of "Japan Travelogue" which is specified by the program identification information 428 is preselected. Also, in accordance with the display control information 431: the display state of the screen element "5" is changed from "not displayed" to "displayed" so that the screen element "Registered" is displayed on the screen.

When the viewer presses the button "3" on the remote controller, the digital broadcast receiving apparatus 102 receives a signal corresponding to the input manipulation information 426. With this manipulation, all episodes of "Japan Travelogue" which are specified by the program identification information 429 are preselected. Also, in accordance with the display control information 432, the display state of the graphics object with ID "5" and the current presentation data are changed in the same way as with the display control information 432.

Figure 5:
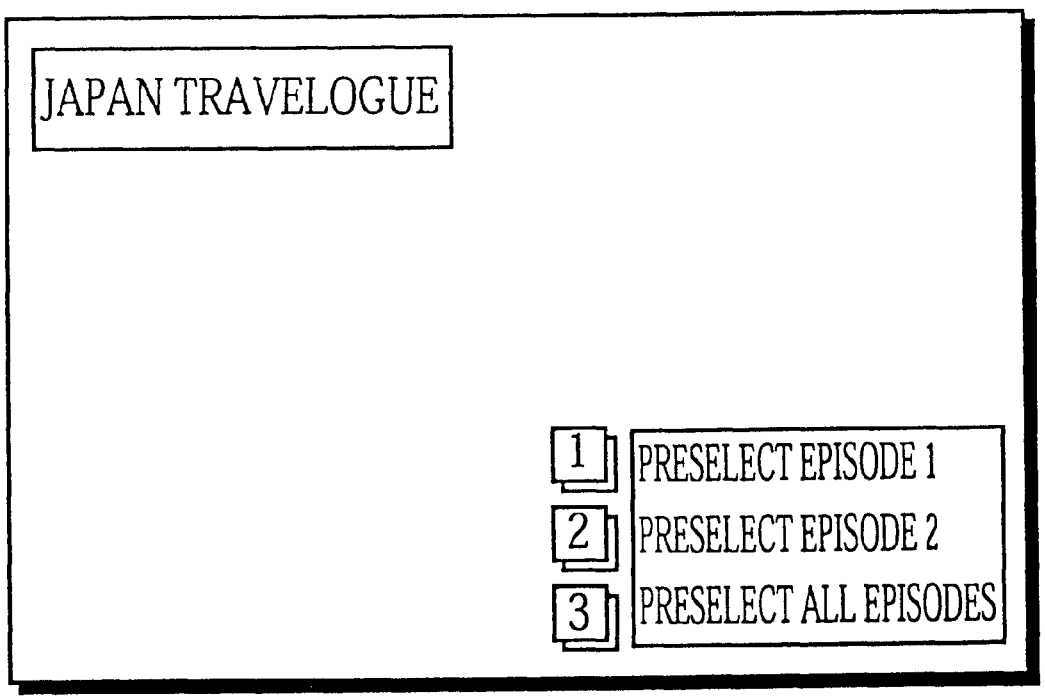
FIG. 5 shows the initial display screen which is composed of the screen elements specified in the preselection control information shown in FIG. 4 in the above-mentioned embodiment.

FIG. 5 shows the initial display screen displayed on the digital broadcast receiving apparatus in accordance with the screen element information 402 of PCI 401, where the image of the presentation data is omitted.

The system table generating unit 114, on receiving an instruction from the transmission control unit 115, reads out the program schedule information 301 from the program schedule information storage unit 112, and generates system tables such as NIT (Network Information Table), SDT (Service Description Table), EIT (Event Information Table), PAT (Program Association Table), and PMT (Program Map Table) which conform to the DVB and MPEG2. FIGS. 6–10 shows the system tables. The system tables are multiplexed into the transport stream together with PCI 401.

The NIT 601, being assigned packet identifier (PID) "0x0010," shows the relationships between "original_network id" and "transport_stream_id," as shown in FIG. 6. The table also includes the specifications concerning the frequencies and modulation methods though they are not shown in the drawings.

The SDT 701, being assigned PID "0x0011," shows the relationships between "descriptor" and "service_id," as shown in FIG. 7. Note that SDT 701 shown in FIG. 7 is related to the transport_stream_id "3."

The EIT 801, being assigned PID "0x0012," shows the relationships between "event_id," "start_time," and "duration," as shown in FIG. 8.

The PAT 901, being assigned PID "0x0000," shows the relationships between "program_number" (equivalent to "service id") and "program_map_PID," as shown in FIG. 9.

The PMT 1001, being assigned PID "0x0030," shows the relationships between the type of presentation data (including PCI) and PID, as shown in FIG. 10.

The system table generating unit 114 generates the system tables and sends them to the transmission control unit 115.

The transmission control unit 115, on receiving the system tables from the system table generating unit 114, refers to the PMT 1001, reads out the presentation data from the A/V data storage unit 111, reads out the PCI 401 from the preselection control information storage unit 113, assigns PIDs to the read presentation data and PCI 401, and sends them to the multiplexing unit 116. In doing so, the presentation ID "7" included in the script "change_presentation 7" of the display control information 430 and 432 is replaced by "0x0051."

When it is the time specified as the start time (broadcast start time) in the program schedule information 301 stored in the program schedule information storage unit 112, that is, when the data transmission start time has been reached, the transmission control unit 115 instructs the multiplexing unit 116 to multiplex the presentation data and PCI 401 into the transport stream. When the broadcast end time, namely, the data transmission end time has been reached, the transmission control unit 115 instructs the multiplexing unit 116 to stop the multiplexing.

It should be noted here that the data transmission start time is usually set to a time "0.1" to several minutes earlier than the broadcast start time, considering the delay caused by the broadcast route 103 and other places.

The multiplexing unit 116, on receiving an instruction to multiplex from the transmission control unit 115, encodes (this process is known as the source coding process) the presentation data and PCI 401, multiplexes them into the transport stream, and sends them to the transmission unit 117. The multiplexing unit 116, on receiving an instruction to stop multiplexing from the transmission control unit 115, stops these processes.

It should be noted here that though the multiplexing unit 116 also multiplexes the system tables into the transport stream, the process is not described here since it is described in Japanese Laid-Open Patent Application No.10-304325.

The transmission unit 117 transmits the transport stream received from the multiplexing unit 116 to the digital broadcast receiving apparatus 102 via the broadcast route 103.

Figure 11:
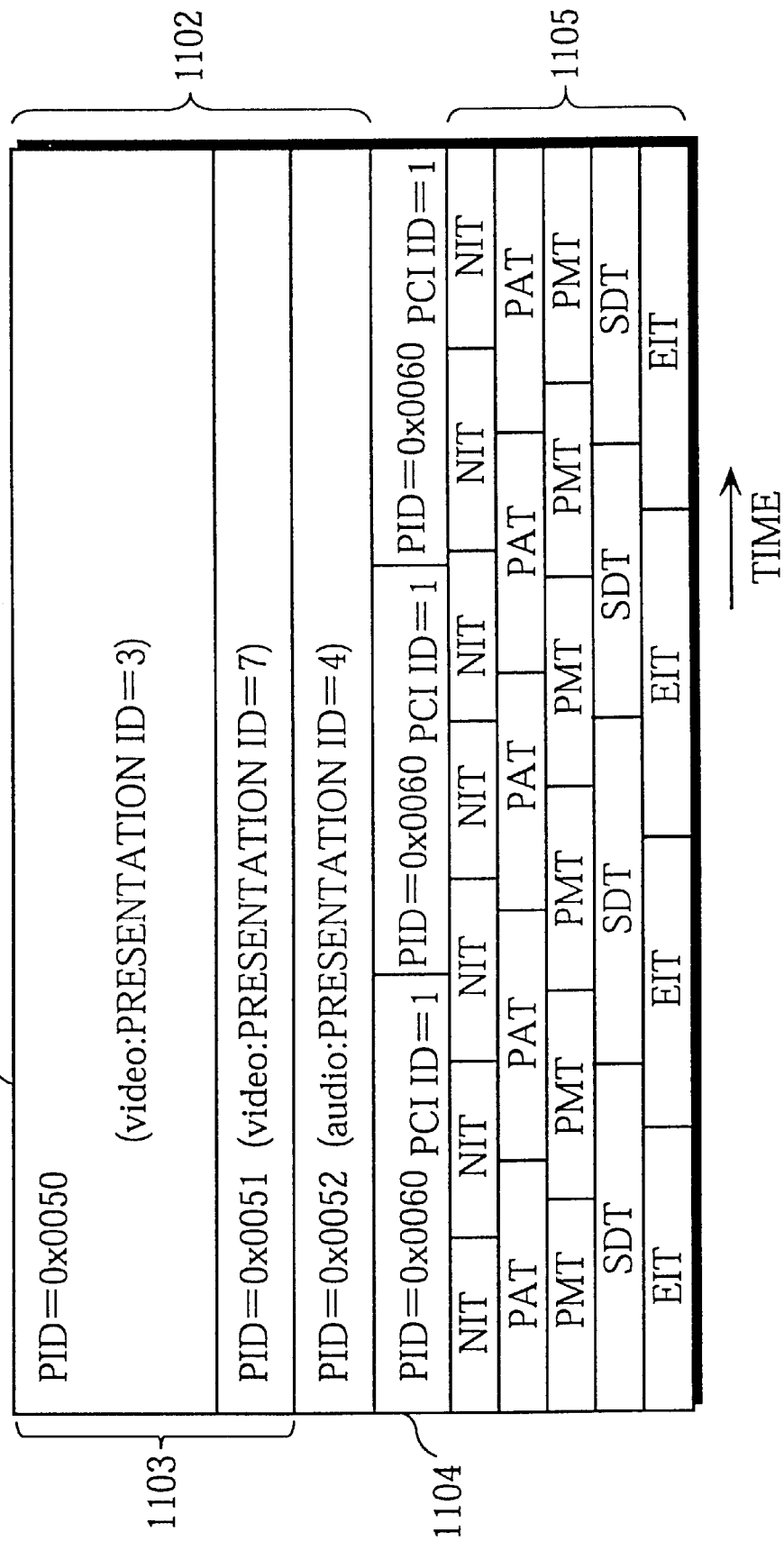
FIG. 11 is a schematic representation of the transport stream which is transmitted from the transmission unit of the above-mentioned embodiment.

FIG. 11 is a schematic representation of the transport stream in which presentation data, system tables and others are multiplexed.

The transport stream 1101 includes presentation data 1102, PCI 1104, and system tables 1105, where the presentation data 1102 makes up the promotional program, and the PCI 1104 includes the screen element information 402 which specifies the image superimposed on the image of the presentation data 1103 (identified by the PIDs "0x0050" (presentation ID "3") and "0x0051" (presentation ID "7") shown in FIG. 2).

The PCI 1104 and system tables 1105 are multiplexed into the private section of the transport stream 1101.

The PCI 1104 is repeatedly multiplexed during the transmission period of the presentation data 1102.

Operation of Digital Broadcast Sending Apparatus 101

Figure 12:
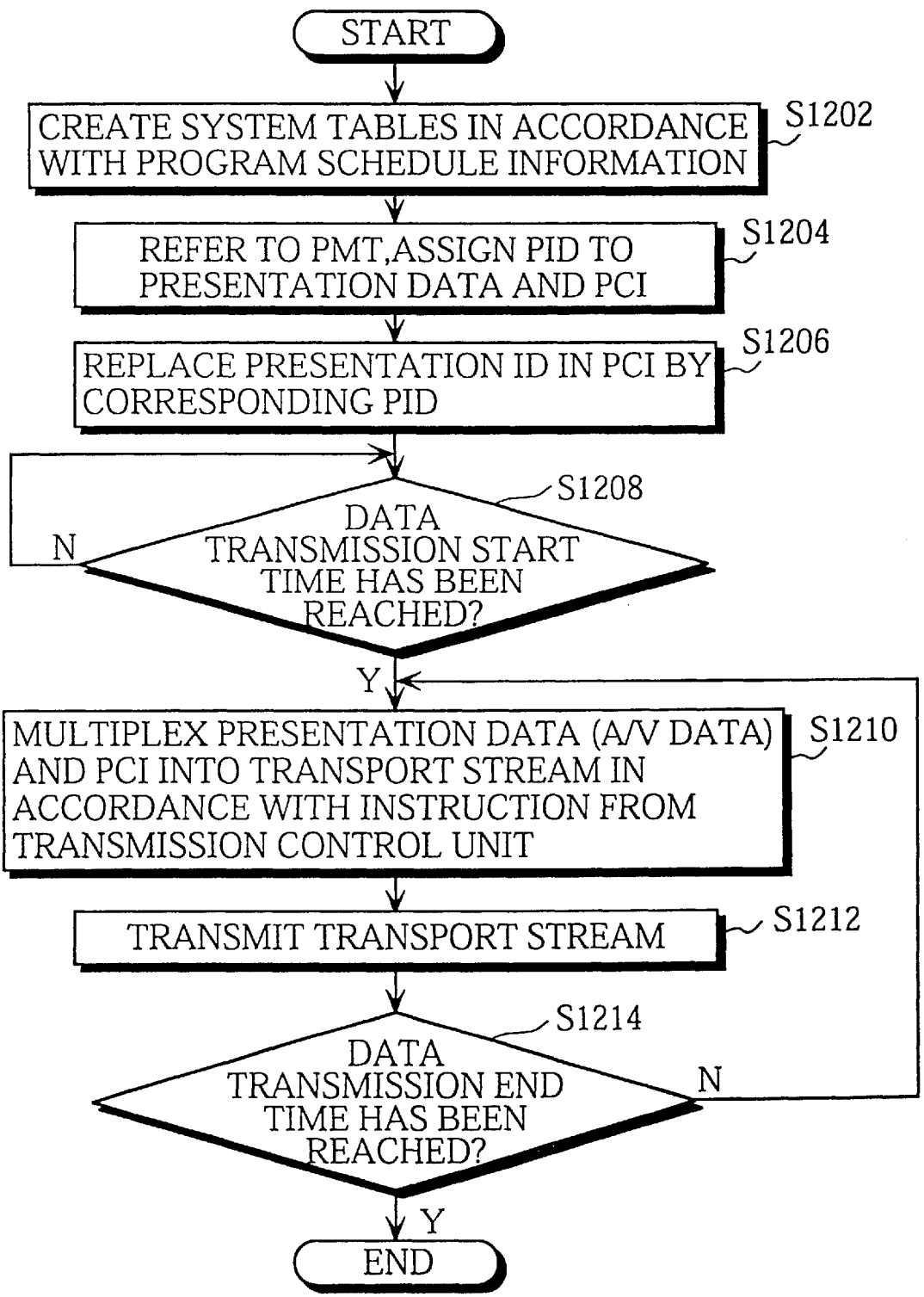
FIG. 12 is a flowchart showing the operation of the digital broadcast sending apparatus of the above-mentioned embodiment.

The operation of the digital broadcast sending apparatus 101 in the present embodiment will be described with reference to the flowchart shown in FIG. 12.

First, the system table generating unit 114 creates system tables such as NIT in accordance with the program schedule information stored in the program schedule information storage unit 112 (S1202).

The transmission control unit 115, on receiving the system tables from the system table generating unit 114, refers to the PMT, reads out the presentation data from the A/V data storage unit 111, reads out the PCI from the preselection control information storage unit 113, and assigns PIDs to the read presentation data and PCI (S1204).

The transmission control unit 115 replaces the presentation IDs included in the display control information of the PCI by corresponding PIDs which have been assigned to the presentation data in S1204 (S1206).

The transmission control unit 115 waits for the data transmission start time to be reached, the data transmission start time being determined based on the "start_time" included in the program schedule information stored in the program schedule information storage unit 112 (S1208). When the data transmission start time has been reached, the transmission control unit 115 instructs the multiplexing unit 116 to multiplex.

The multiplexing unit 116, on receiving the instruction to multiplex from the transmission control unit 115, encodes the presentation data and PCI, multiplexes them into the transport stream, and sends them to the transmission unit 117 (S1210).

The transmission unit 117 transmits the transport stream received from the multiplexing unit 116 to the digital broadcast receiving apparatus 102 via the broadcast route 103 (S1212).

When it is the data transmission end time which is determined based on the "start_time" and "duration" included in the program schedule information, the transmission control unit 115 instructs the multiplexing unit 116 to stop the multiplexing (S1214), and ends the process.

Construction of Digital Broadcast Receiving Apparatus 102

The digital broadcast receiving apparatus 102 includes a receiving unit 121, a TS (Transport Stream) decoder unit 122, an A/V (Audio/Video) decoder unit 123, a reproducing unit 124, an audio outputting unit 125, a video outputting unit 126, a system table storage unit 127, a preselection control information storage unit 128, an input receiving unit 129, a reception control unit 130, a preselection information storage unit 131, and a time managing unit 132.

The receiving unit 121 receives the transport stream from the digital broadcast sending apparatus 101 via the broadcast route 103, and outputs to the TS decoder unit 122 only the transport stream corresponding to the "transport stream_id" specified by the reception control unit 130.

The TS decoder unit 122 extracts system tables such as NIT, SDT, EIT, PAT, and PMT from the transport stream the receiving unit 121 has received. In doing so, the TS decoder unit 122 uses the PIDs specified by the reception control unit 130. The TS decoder unit 122 then writes the extracted system tables into the system table storage unit 127.

The TS decoder unit 122 also extracts the presentation data having the PID specified by the reception control unit 130, and outputs the extracted presentation data to the system table storage unit 127.

The TS decoder unit 122 also extracts the PCI having the PID specified by the reception control unit 130, and outputs the extracted PCI to the preselection control information storage unit 128.

The A/V decoder unit 123 decodes the presentation data received from the TS decoder unit 122, and outputs the decoded presentation data to the reproducing unit 124.

The reproducing unit 124, in accordance with the control by the reception control unit 130, divides the presentation data decoded by the A/V decoder unit 123 into the audio data and video data. The reproducing unit 124 converts the audio data into an audio signal and outputs the audio signal to the audio outputting unit 125.

Similarly, the reproducing unit 124 converts the video data into a video signal and outputs the video signal to the video outputting unit 126. In doing so, when the screen element information has been specified by the reception control unit 130, the reproducing unit 124 converts the screen element information into a video signal and outputs the video signal to the video outputting unit 126 so that the image specified by the screen element information is superimposed on the image of the presentation data on the screen.

The audio outputting unit 125 converts the digital audio signal received from the reproducing unit 124 into an analog audio signal, and outputs the analog audio signal to an external speaker (not illustrated).

The video outputting unit 126 converts the digital video signal input from the reproducing unit 124 into analog video signal in accordance with the NTSC method, PAL method or the like, and outputs the analog video signal to an external display being a CRT or the like. Note that the digital video signal may be output to the external display as it is.

The system table storage unit 127, being achieved by a RAM or the like, stores the system tables extracted by the TS decoder unit 122. For example, the system table storage unit 127 stores NIT 601, SDT 701, EIT 801, PAT 901, and PMT 1001 shown in FIGS. 6–10.

When the viewer has preselected the first episode of "Japan Travelogue," system tables shown in FIGS. 13–16 are stored in the system table storage unit 127, as well as NIT 601 shown in FIG. 6.

FIG. 13 shows SDT 1301 corresponding to the transport stream_id "2." FIG. 14 shows EIT 1401 in which the start time of the first episode of "Japan Travelogue" is written. FIG. 15 shows PAT 1501 corresponding to the service ID "9." FIG. 16 shows PMT 1601 in which the PTD of the presentation data for the first episode of "Japan Travelogue" is written.

The preselection control information storage unit 128, being achieved by a RAM or the like, stores PCIs extracted by the TS decoder unit 122. FIG. 17 shows PCI 1701 which may be stored in the preselection control information storage unit 128 during a period between 12:00 on Jan. 1, 1999 to 12:05. The PCI 1701 differs from the PCI 401 shown in FIG. 4 only in that it has the script "change_presentation 0x0051" in the display control information 1702 and 1703 so that the presentation data is identified by the packet identifier.

The input receiving unit 129 receives signals input by the viewer to select or preselect TV programs, and sends the received signals to the reception control unit 130.

The reception control unit 130 includes a ROM and a RAM, where the ROM stores a control program used for controlling the reception of the transport streams and for interpreting PCI, and the RAM is used as a work area. The reception control unit 130 performs operation in accordance with the control program. The construction of the reception control unit 130 will be described later as the operation controlled by the control program is described.

The preselection information storage unit 131 is achieved by a non-volatile RAM or the like. When the viewer preselects an object program, the preselection information storage unit 131 stores a combined set of identification numbers out of 1704, 1705, and 1706 which identifies the program identification information related to the object program selected by the viewer.

Figure 18:
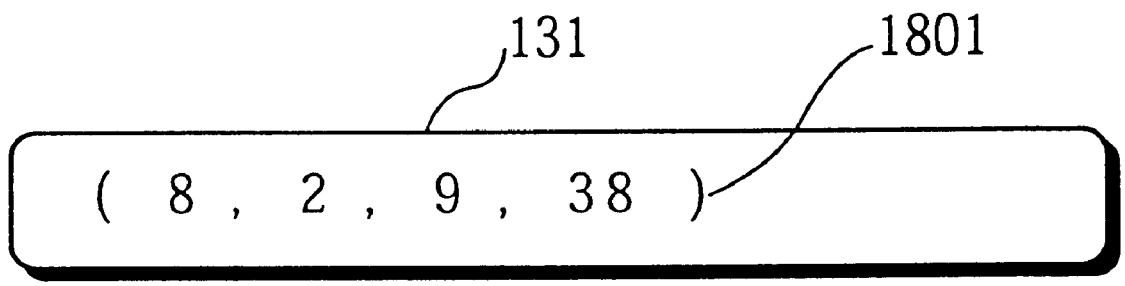
FIG. 18 shows an example of preselection information stored in the preselection information storage unit of the above-mentioned embodiment.

FIG. 18 shows the data stored in the preselection information storage unit 131 when the viewer has preselected the first episode of the "Japan Travelogue." The preselection information 1801 is a set of identification numbers 8, 2, 9, 38 which is a set of original_network_id, transport_stream_id, service_id, and event_id related to the first episode of "Japan Travelogue." It is needless to say that when a plurality of programs are selected, a plurality of pieces of preselection information are stored.

Alternatively, the start_time of the selected program may also be stored in the preselection information 1801 so that each system table starts being extracted before the start_time.

the time managing unit 132 manages the time. On receiving an inquiry about time from the reception control unit 130, the time managing unit 132 sends the current time to the reception control unit 130. The time managed here includes information on year, month, day, hour, minute, and second. The time is managed in a procedure in which the TS decoder unit 122 extracts TDT (Time Date Table: not illustrated in FIG. 12) from the transport stream, the TS decoder unit 122 sends the extracted TDT to the time managing unit 132 via the reception control unit 130, and the time managing unit 132 keeps the time based on the received TDT, where the TDT is defined in the DVB standard. In the present example, the current time is kept based on the TDT. However, an internal clock may be used for keeping the current time.

Operation of Digital Broadcast Receiving Apparatus 102

Figure 20:
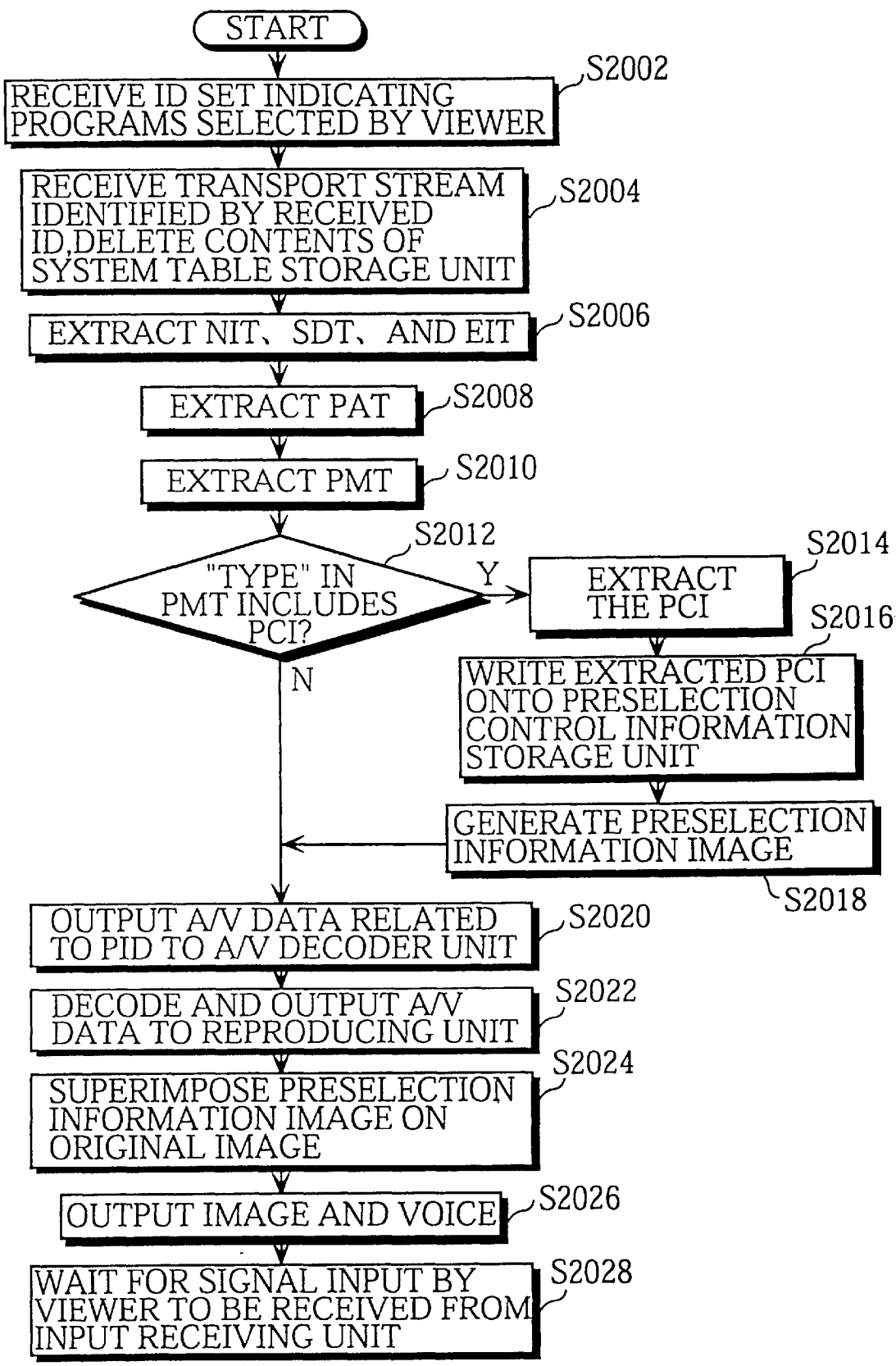
FIG. 20 is a flowchart showing the operation of the digital broadcast receiving apparatus in the above-mentioned embodiment in which the preselection screen shown in FIG. 19A is displayed.
Figure 21:
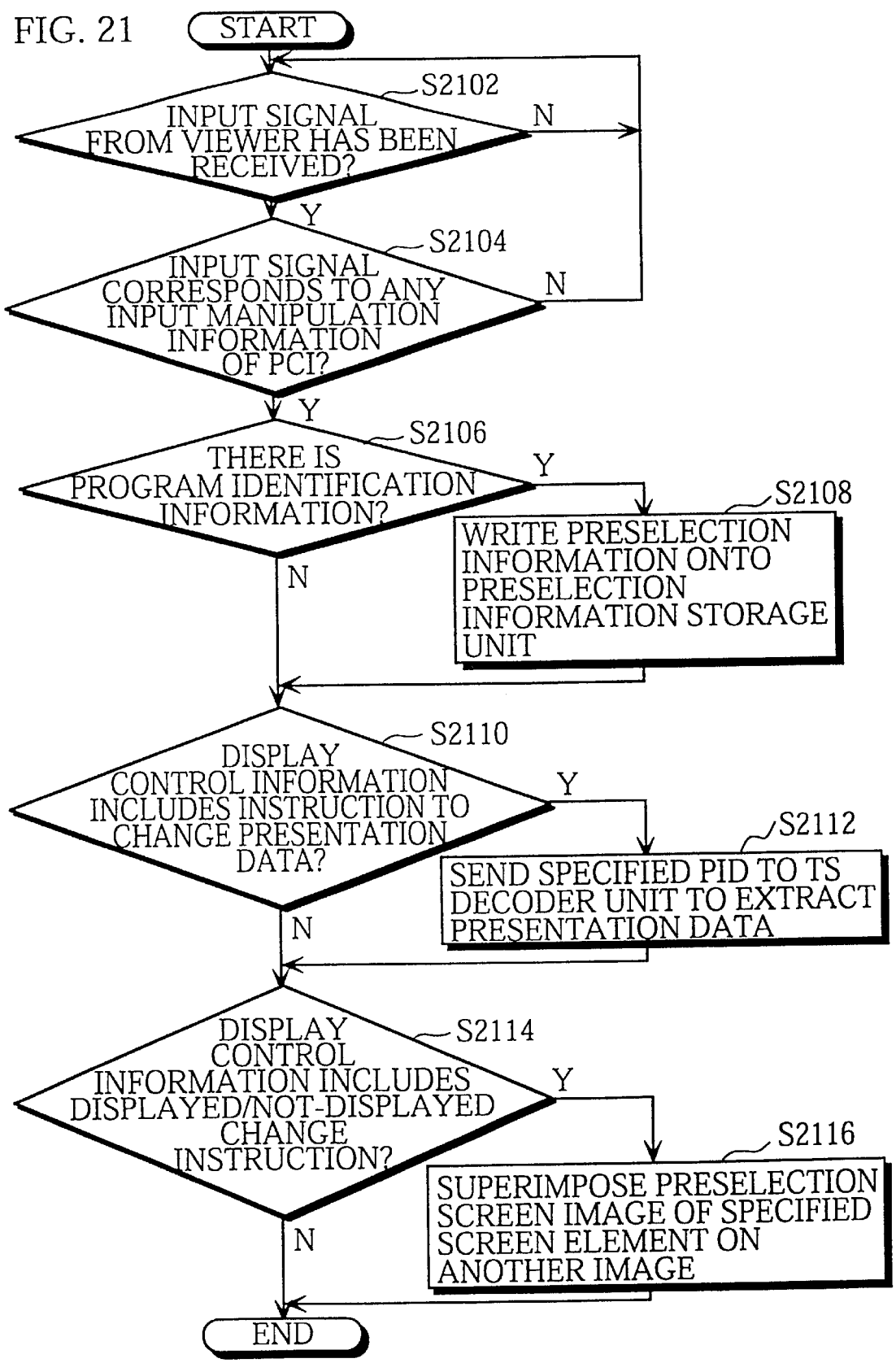
FIG. 21 is a flowchart showing the operation of the digital broadcast receiving apparatus of the above-mentioned embodiment in which programs are preselected.
Figure 22:
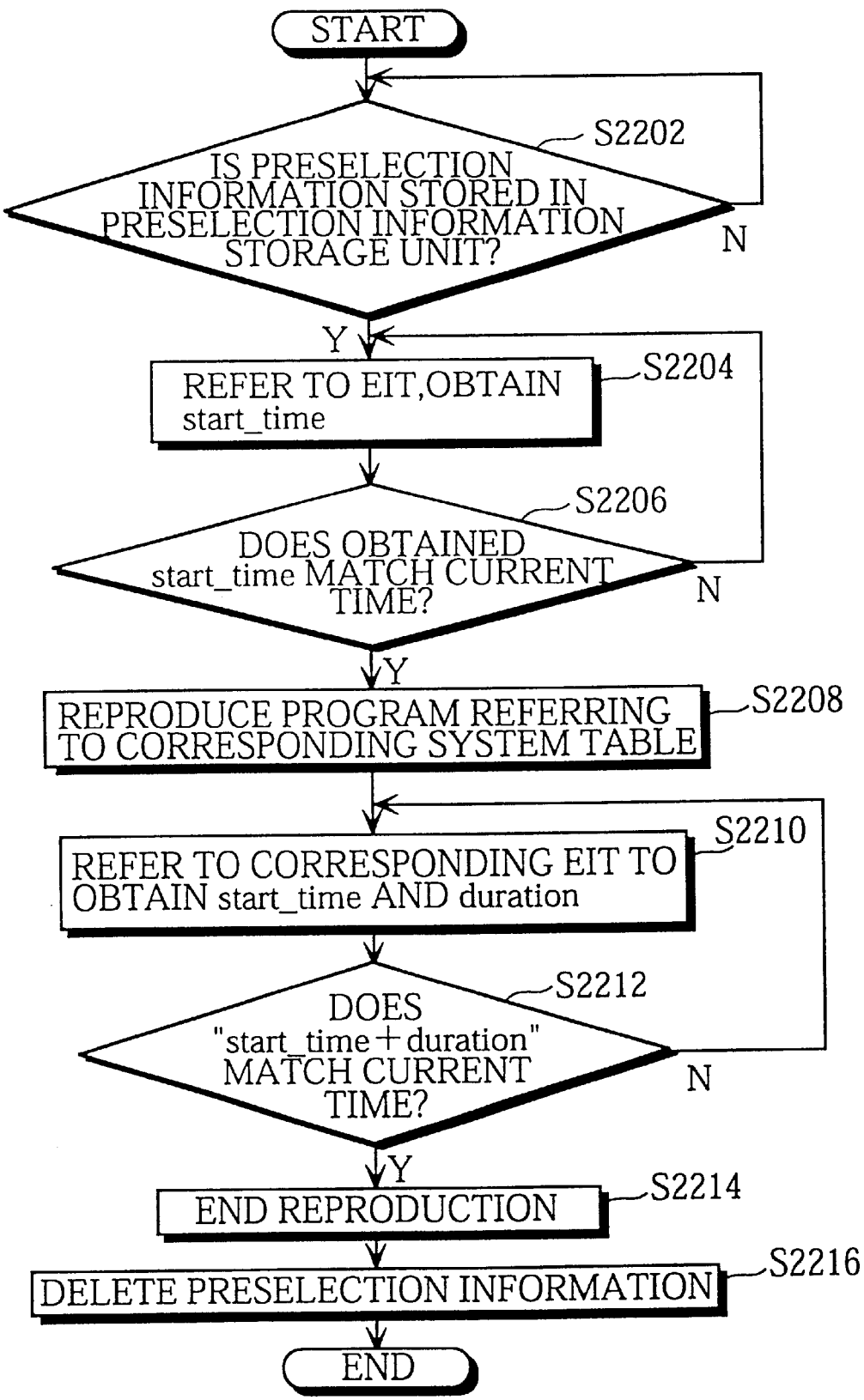
FIG. 22 is a flowchart showing the operation of the digital broadcast receiving apparatus of the above-mentioned embodiment in which programs are preselected.

The operation of the digital broadcast receiving apparatus 102 in the present embodiment will be described with reference to the flowcharts shown in FIGS. 20–22, centering on the control performed by the reception control unit 130, and with reference to the screens (FIGS. 19A–19D) displayed on the screen.

Figure 19A:
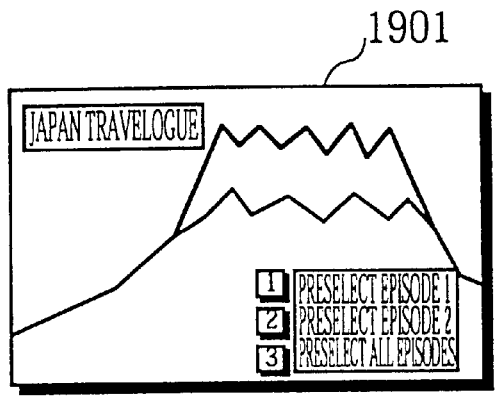
FIG. 19A shows an example of preselection screen displayed on the external display from a video signal output from the video outputting unit of the above-mentioned embodiment.
Figure 19B:
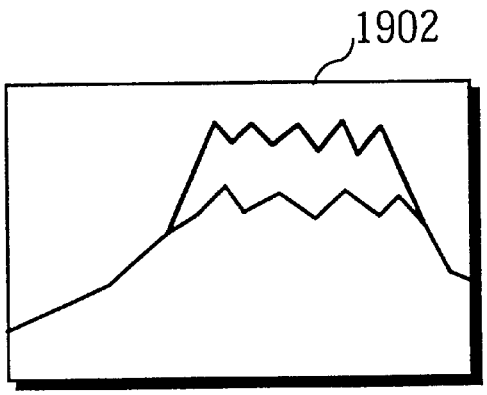
FIG. 19B shows an example of original image displayed on the external display in the above-mentioned embodiment.

FIG. 19A shows a preselection screen displayed on a display device such as a CRT. The preselection screen image 1901 is formed by superimposing preselection information image 1903 (shown in FIG. 19C) on original image (video data) 1902 (shown in FIG. 19B), where the preselection information image 1903 is generated by the reception control unit 130 in accordance with the screen element information 1707 of the PCI 1701. FIG. 19D shows a preselection notification image 1904 which is displayed when the preselection process is completed.

First, the reception control unit 130 receives a set of original_network_id, transport_stream_id, service_id, and event_id via the input receiving unit 129, the set of IDs indicating an object program selected by the viewer (S2002).

The reception control unit 130 instructs the receiving unit 121 to receive the transport stream corresponding to the received transport_stream_id. It is supposed here that the receiving unit 121 receives the transport stream of the network (satellite network, cable network, etc.) corresponding to the received original_network id. Also, the reception control unit 130 deletes the contents of the system table storage unit 127 and the preselection control information storage unit 128 (S2004).

The reception control unit 130 instructs the TS decoder unit 122 to extract system tables NIT, SDT, and EIT (S2006). The TS decoder unit 122 extracts the system tables and writes them in the system table storage unit 127.

The reception control unit 130 sends the PID "0x0000" to the TS decoder unit 122 and instructs it to extract the PAT (S2008). The TS decoder unit 122 extracts the PAT and writes it in the system table storage unit 127.

The reception control unit 130 refers to the PAT stored in the system table storage unit 127, sends PID "0x0030" of PMT to the TS decoder unit 122 and instructs the unit 122 to extract the PMT (S2010). The TS decoder unit 122 extracts the PMT and writes it in the system table storage unit 127.

The reception control unit 130 judges whether the "type" column in the PMT includes a PCI (S2012). When having judged that the "type" column in the PMT includes a PCI, the reception control unit 130 sends the PID to the TS decoder unit 122, and instructs it to extract the PCI corresponding to the PID (S2014).

The TS decoder unit 122 writes the extracted PCI onto the preselection control information storage unit 128 (S2016).

The reception control unit 130 reads out the PCI from the preselection control information storage unit 128, interprets the screen element information of the read PCI, generates the preselection information image, and sends the generated preselection information image to the reproducing unit 124 (S2018).

Figure 19C:
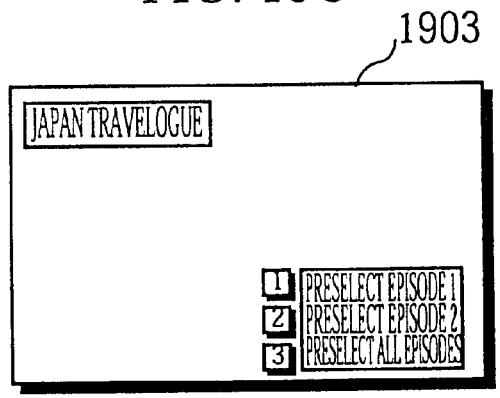
FIG. 19C shows the screen elements specified in the preselection control information to be superimposed on the original image shown in FIG. 19B displayed on the external display.
Figure 19D:
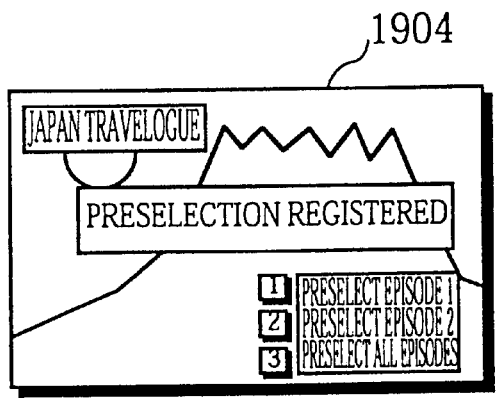
FIG. 19D shows a preselection notification image which is displayed when the preselection process is completed.

For example, when the preselection control information storage unit 128 stores PCI 1701, the reception control unit 130 generates the preselection information image 1903 shown in FIG. 19C from the screen element information 1707.

After S2018, or when the reception control unit 130 judges that the "type" column in tho PMT does not include a PID in S2012, sends to the TS decoder unit 122 the PIDs corresponding to the "video" and "audio" written in the "type" column in the PMT, and instructs the TS decoder unit 122 to output the presentation data related to the PIDs to the A/V decoder unit 123 (S2020). In doing so, when "video" corresponds to a plurality of PIDs, the first (the top one in the drawing) PID is sent.

The A/V decoder unit 123 decodes the A/V data input from the TS decoder unit 122, and outputs the decoded A/V data to the reproducing unit 124 (S2022).

When having received the preselection information image from the reception control unit 130, the reproducing unit 124 superimposes the preselection information image on the original image (S2024). The video signal is output to the video outputting unit 126, and the audio signal is output to the audio outputting unit 125 (S2026).

For example, when the reproducing unit 124 has received the preselection information image 1903 shown in FIG. 19C from the reception control unit 130, and original image 1902 shown in FIG. 19B from the A/V decoder unit 123, the preselection screen image 1901 shown in FIG. 19A, in which the image 1903 is superimposed on the image 1902, is displayed on the screen.

The reception control unit 130 waits for a signal input by the viewer to be received from the input receiving unit 129 (S2028).

Now, the procedure of receiving preselection instructions will be described.

The reception control unit 130 waits for a signal input by the viewer (S2102). Having received a signal, the reception control unit 130 judges whether the signal corresponds to any of input manipulation information 1708, 1709, and 1710 of the PCT 1701 stored in the preselection control information storage unit 128 (S2104). When the signal does not correspond to any piece of input manipulation information, control returns to S2102.

When having judged that the signal corresponds to any of input manipulation information 1708, 1709, and 1710 in S2104, the reception control unit 130 judges whether there is program identification information (1704, 1705, or 1706) corresponding to the input manipulation information (S2106). When this is judged negatively, control goes to S2110; when this is judged positively, control goes to S2108 in which the preselection information written in the program identification information is written into the preselection information storage unit 131 (S2108).

For example, when the viewer presses the key "1" on the remote controller while the preselection screen image 1901 (FIG. 19A) is displayed, the reception control unit 130 receives the input signal via the input receiving unit 129, judges that the signal corresponds to the input manipulation information "push_key" 1708 of the PCI 1701, and writes the program identification information "reserve 8, 2, 9, 38" 1704 in the preselection information storage unit 131 as the preselection information (8, 2, 9, 38) 1801, as shown in FIG. 18.

The reception control unit 130 judges whether the display control information includes presentation data change instruction (S2110). When this is judged positively, the reception control unit 130 sends to the TS decoder unit 122 the PID of the presentation data in the display control information corresponding to the input manipulation information, and instructs the TS decoder unit 122 to extract the presentation data (S2112). The TS decoder unit 122 newly extracts presentation data using the PID as the condition for separation, and outputs the presentation data to the A/V decoder unit 123.

The reception control unit 130 judges whether the display control information corresponding to the input manipulation information includes the displayed/not-displayed change instruction (1711 or the like) (S2114). Having judged positively, the reception control unit 130 generates the preselection screen image by changing the display state of the specified screen element (graphics object), sends the screen image to the reproducing unit 124, and instructs the reproducing unit 124 to superimpose one image on another image (S2116).

The reproducing unit 124 creates a composite image from the images input from the A/V decoder unit 123 and the reception control unit 130, and outputs the composite image to the video outputting unit 126. With this step, the process of receiving preselection instructions ends.

For example, when the viewer presses key "1" on the preselection screen image 1901, the preselection information 1801 is written into the preselection information storage unit 1131, and a video signal is output from the video outputting unit 126. This changes the screen to the preselection notification image 1904. The display state of the screen element "5" is changed from "not displayed" to "displayed" and the screen element "Preselection Registered" is displayed on the screen. Also, the presentation data is changed to that with PID "0x0051" (presentation ID=7 shown in FIG. 2) of still picture 202.

Now, the preselection of programs will be explained.

Firstly, the reception control unit 130 waits the preselection information storage unit 131 to store the preselection information 1801 (S2202). When the preselection information storage unit 131 has stored the preselection information 1801, the reception control unit 130 instructs the receiving unit 121 to receive the transport stream corresponding to the "transport_stream_id=2" written in the preselection information 1801. Also, the reception control unit 130 sends the PID "0x0012" to the TS decoder unit 122, and instructs the TS decoder unit 122 to extract the EIT. Also, the reception control unit 130 obtains the start time of the program corresponding to the "event_id=38" written in the preselection information 1801 by referring to the EIT 1401 stored in the system table storage unit 127 (S2204).

The reception control unit 130 asks the time managing unit 132 the current time, and judges whether the obtained start time matches the current time (S2206). If they do not match, control returns to S2204. If they match, the reception control unit 130 refers to the system tables corresponding to the start time which are stored in the system table storage unit 127, sends PIDs to the TS decoder unit 122, and instructs the TS decoder unit 122 to extract the presentation data identified by the PIDs.

The TS decoder unit 122 sends the presentation data of the selected program to the A/V decoder unit 123. The A/V decoder unit 123 decodes the presentation data, and sends the decoded presentation data to the reproducing unit 124. The reproducing unit 124 outputs the audio data to the audio outputting unit 125, and the video data to the video outputting unit 126. The audio outputting unit 125 outputs the audio data from the external speaker as the sound, and the video outputting unit 126 outputs the video data from the external display as the promotional program (S2208).

More specifically, the system table storage unit 127 stores the NIT shown in FIG. 6, the SDT 1301, EIT 1401, PAT 1501, and PMT 1601 respectively shown in FIGS. 13–16. The TS decoder unit 122 extracts the video data and audio data with PIDs "0x0080" and "0x0081" based on these system tables. The first episode of the preselected program "Japan Travelogue" is thus reproduced based on the video data and audio data.

Next, the reception control unit 130 reads out the "start_time" and "duration" of the EIT 140 from the system table storage unit 131 (S2210), adds the time specified by the "duration" to the "start time" to obtain the reproduction end time. The reception control unit 130 asks the time managing unit 132 the current time, and judges whether the obtained reproduction end time matches the current time (S2212). If they do not match, control returns to S2210. If they match, the reception control unit 130 instructs the TS decoder unit 122 to stop extracting presentation data to end the reproduction (S2214). The reception control unit 130 then deletes the preselection information from the preselection information storage unit 131 (S2216). The present process ends with this step.

In the present embodiment, the digital broadcast receiving apparatus 102 reproduces the preselected programs. However, the audio outputting unit 125 and the video outputting unit 126 may be connected to a video tape recorder so that the video tape recorder records the preselected programs.

Also, in the above embodiment, the preselection screen is displayed when the viewer selects the promotional program to be displayed. However, it is also possible that the preselection information image is superimposed on the currently displayed image when the viewer presses, for example, a "preselection screen" key on the remote controller. To achieve this function, the default display states in the fifth column 415 of the screen element information of PCI are all set to "not-displayed," and the input manipulation information additionally includes the following description:

push reserve_screen_key {
    change_visibility 1
    change_visibility 2
    change_visibility 3
    change_visibility 4
    change_visibility 6
    }

With the above arrangement, it is possible for the viewer to preselect, for example, a next episode of a series or a program related to the currently promotional program while a usual program, not the promotional program, is broadcast.

In the above embodiment, manipulation objects "button 1," "button 2," and "button 3" are described in the PCIs 401 and 1701. However, such manipulation objects may be displayed in the screen image of the presentation data 201. With such a construction, the preselection information image need not be superimposed on the original image.

In the above embodiment, presentation data 201 and 202 of video data are multiplexed into the transport stream 1101 so that when preselection of a program completes, the displayed image changes to another one. However, when preselection of a program completes, the audio data may be changed to another one. This is achieved by multiplexing two pieces of audio data for such a promotional program into the transport stream 1101, and specifying audio data in the display control information 1702 and 1703. Also, it is possible to change both video data and audio data.

In the above embodiment, the promotional program is broadcast before the object programs. However, in case of, for example, digital satellite broadcasts, the promotional program may be broadcast in the same broadcast periods as the object programs. In such a case, the reception control unit 130 writes the preselection information onto the preselection information storage unit 131, instructs the receiving unit 121 to receive the transport stream corresponding to the "transport_stream_id" written in the preselection information, sends the PID to the TS decoder unit 122, and instructs the TS decoder unit 122 to extract the EIT. Also, the reception control unit 130 obtains the "start_time" and "duration" of the program corresponding to the "event_id" written in the preselection information by referring to the EIT.

The reception control unit 130 asks the time managing unit 132 the current time, and compares the obtained "start_time" with the current time. When the current time is in the period between the "start_time" and "start time+duration," the reception control unit 130 immediately refers to the system tables corresponding to the latest reselected program stored in the system table storage unit 127, and instructs the TS decoder unit 122 to extract the presentation data of the program. With this arrangement, the preselected program is reproduced as soon as the viewer performs a manipulation for the preselection of the program. That is, with this arrangement, the viewer can enjoy the same effects as selecting a program to be reproduced currently.

In the above embodiment, the PCI 1701 includes the screen element information 1707. However, the screen element information 1707 may be omitted. Instead, the input manipulation information in the program preselection and manipulation control information may specify the bitmap data to be displayed.

In the above embodiment, the digital broadcast receiving apparatus 102 has the construction as shown in FIG. 1 with which the program preselecting function is achieved. However, a digital broadcast receiving apparatus which does not have this construction may be arranged to have the same function by loading into the apparatus a recording medium storing a program that allows the apparatus to function as the digital broadcast receiving apparatus 102.

In the above embodiment, the digital broadcast sending apparatus 101 includes the A/V data storage unit 111, and multiplexes the presentation data into the transport stream together with the preselection control information 401. However, the digital broadcast sending apparatus may multiplex only preselection control information 401 into the transport stream and send it to the receiving apparatus. In this case, the digital broadcast receiving apparatus 102 sends the preselection information image generated by the reception control unit 130 to the reproducing unit 124. The reproducing unit 124 displays the preselection information image on an external display via the video outputting unit 126. The viewer can perform a manipulation for preselecting a program watching the displayed preselection information image.

In the above embodiment, a plurality of pieces of presentation data 1102 are multiplexed in the transport stream, as shown in FIG. 11. However, only a piece of presentation data of audio data or only a piece of presentation data of video data may be multiplexed in the transport stream. In such a case, for example, the digital broadcast receiving apparatus 102 displays a preselection information image while outputting a background music or displays a preselection information image by superimposing it on a background video image.

In the above embodiment, when the viewer performs a manipulation for preselecting a program, the display state of the graphics object is changed in accordance with the displayed/not-displayed change instruction, or the current piece of presentation data is changed to another piece of presentation data in accordance with the presentation data change instruction. However, only one piece of presentation data for one broadcast program may be multiplexed into the transport stream so that the piece of presentation data is reproduced when the preselection is complete.

In the above case, the PCI is first extracted from the transport stream, and the script written in the PCI is interpreted. The script includes an instruction to prohibit the presentation data from being output from the reproducing unit 124 until a manipulation corresponding to the input manipulation information is received. With this arrangement, the presentation data with the PID written in the PMT 1001 is output when the viewer performs the manipulation for preselecting a program.

When the presentation data is audio, it is possible to output a voice message "PRESELECTION HAS BEEN REGISTERED" to notify the viewer of it after the preselection process is complete.

When the presentation data is video, it is possible to display a video image including a message "PRESELECTION HAS BEEN REGISTERED" as a background of the preselection screen image to notify the viewer of it after the preselection process is complete.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital broadcast sending apparatus which sends a transport stream to a digital broadcast receiving apparatus, comprising:

a presentation data storage means for storing a plurality of pieces of presentation data of a broadcast program, wherein each of the plurality of pieces of presentation data is either of video data, audio data or a combination of video data and audio data;

a preselection control information storage means for storing preselection control information which is used by the digital broadcast receiving apparatus to receive instructions from a viewer concerning preselection of object programs, the preselection control information including: a first script which specifies a manipulation of the viewer performed to preselect an object program; and a second script which includes program identification information specifying the object program corresponding to the manipulation specified in the first script and includes an instruction to perform a process of preselecting the specified object program when the viewer performs the manipulation;

a multiplexing control means for reading the plurality of pieces of presentation data from the presentation data storage means and the preselection control information corresponding to the plurality of pieces of presentation information from the preselection control information storage means, and multiplexing the read plurality of pieces of presentation data and the read preselection control information into the transport stream during a transmission period which is determined based on a broadcast time of the broadcast program; and a sending means for sending the transport stream in which the read plurality of pieces of presentation data and the read preselection control information are multiplexed.

2. The digital broadcast sending apparatus of claim 1, wherein
the preselection control information further includes a third script which specifies that when an object program is preselected, either a piece of presentation data currently reproduced is changed to another piece of presentation data or graphics data is reproduced, the graphics data being included in the preselection control information.

3. The digital broadcast sending apparatus of claim 2, wherein
the first script further includes a manipulation object which is superimposed on an original image of a piece of presentation data of video data reproduced on a display of the digital broadcast receiving apparatus.

4. The digital broadcast sending apparatus of claim 3, wherein
the second script specifies a plurality of object programs.

5. The digital broadcast sending apparatus of claim 3, wherein
the presentation data storage means further stores another plurality of presentation data of the object program specified in the second script, and
the digital broadcast sending apparatus further comprises:
a system table generating means for generating an Event Information Table (EIT) which shows broadcast time information of the object program, and
the multiplexing control means starts, a predetermined time before a broadcast start of the object program, repeatedly multiplexing the generated EIT into the transport stream, reads the other plurality of presentation data of the object program from the presentation data storage means, and multiplexes the presentation data into the transport stream during the transmission period.

6. The digital broadcast sending apparatus of claim 5, wherein
the second script includes a set of original_network id, transport_stream_id, service_id, and event_id for use of specifying object programs, and
the system table generating means generates system tables whereby the digital broadcast receiving apparatus extracts the other plurality of presentation data of the object program identified by the set of original_network_id, transport_stream_id, service_id, and event_id, and
the multiplexing control means starts, a predetermined time before a broadcast start of the object program, repeatedly multiplexing the generated system tables into the transport stream during the transmission period.

7. The digital broadcast sending apparatus of claim 1, wherein
the first script further includes a manipulation object which is superimposed on an original image of a piece of presentation data of video data reproduced on a display of the digital broadcast receiving apparatus.

8. The digital broadcast sending apparatus of claim 7, wherein
the second script specifies a plurality of object programs.

9. A digital broadcast receiving apparatus for receiving a transport stream in which a plurality of pieces of presentation data of a broadcast program and preselection control information are multiplexed, wherein each of the plurality of pieces of presentation data is of video data, audio data or a combination of video data and audio data, and the preselection control information is used for receiving instructions from a viewer concerning preselection of object programs, the digital broadcast receiving apparatus comprising:
a receiving/extracting means for receiving the transport stream and extracting the plurality of pieces of presentation data and the preselection control information from the received transport stream, wherein the preselection control information includes: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation;
a display processing means for displaying an original image on an external display based on a piece of presentation data being video data extracted by the receiving/extracting means;
a preselection receiving means for receiving a manipulation performed by the viewer; and
a script interpreting/executing means for executing the second script when the manipulation received by the preselection receiving means matches contents of the first script.

10. The digital broadcast receiving apparatus of claim 9, wherein
the preselection control information further includes a third script which specifies that when an object program is preselected, either a piece of presentation data currently reproduced is changed to another piece of presentation data or graphics data is reproduced, the graphics data being included in the preselection control information,
the script interpreting/executing means includes:
a third script interpreting unit for interpreting the third script; and
an extraction control unit for: instructing the receiving/extracting means to stop extracting a current piece of presentation data and start extracting another piece of presentation data when the interpreted third script specifies that a piece of presentation data currently reproduced is changed to another piece of presentation data; and extracting the graphics data from the preselection control information and instructing the display processing means to display the extracted graphics data when the interpreted third script specifies that the graphics data is reproduced, wherein the graphics data is superimposed on the original image when the graphics data is displayed.

11. The digital broadcast receiving apparatus of claim 10, wherein
the first script further includes a manipulation object which is superimposed on the original image.

12. The digital broadcast receiving apparatus of claim 11, wherein
the second script specifies a plurality of object programs, and
the digital broadcast receiving apparatus further comprises:
a program identification information storage means for, when the preselection receiving means receives a manipulation performed by the viewer, storing program identification information which specifies all of the plurality of object programs recognized by the script interpreting/executing means through the execution of the second script.

13. The digital broadcast receiving apparatus of claim 11, wherein an Event Information Table (EIT) showing a broadcast start time and a broadcast duration of the object program is multiplexed in the transport stream, and presentation data of the object program is also multiplexed in the transport stream, the digital broadcast receiving apparatus further comprises:

a timer for clocking time; and
a program identification information storage means for storing the program identification information which is obtained by the script interpreting/executing means, wherein
the script interpreting/executing means instructs the receiving/extracting means to extract the EIT which shows the object program identified through the program identification information stored in the program identification information storage means, refers to the timer for the current time, and instructs the receiving/extracting means to extract the presentation data of the object program shown in the EIT either when the broadcast start time written in the EIT matches the current time or when the current time is in the broadcast duration starting from the broadcast start time.

14. The digital broadcast receiving apparatus of claim 13, wherein system tables are multiplexed in the transport stream, and
the second script includes a set of original_network_id, transport_stream_id, service_id, and event_id for use of specifying object programs, and the system tables are used to extract object programs specified by the set of original network_id, transport_stream_id, service_id, and event_id, and
the script interpreting/executing means instructs the receiving/extracting means to extract the system tables, refers to the extracted system tables and the EIT to control the receiving/extracting means.

15. The digital broadcast receiving apparatus of claim 9, wherein the first script further includes a manipulation object which is superimposed on the original image,
the digital broadcast receiving apparatus further comprises:
a program identification information storage means for storing the program identification information which is obtained by the script interpreting/executing means.

16. The digital broadcast receiving apparatus of claim 15, wherein the second script specifies a plurality of object programs, and
the program identification information storage means stores all program identification information obtained by the script interpreting/executing means when the preselection receiving means receives a manipulation performed by the viewer.

17. A digital broadcast sending/receiving system which includes a digital broadcast sending apparatus and a digital broadcast receiving apparatus, wherein the digital broadcast sending apparatus sends a transport stream to the digital broadcast receiving apparatus and the digital broadcast receiving apparatus displays a preselection information image on an external display, the digital broadcast sending apparatus comprising:

a presentation data storage means for storing a plurality of pieces of presentation data of a broadcast program, wherein each of the plurality of pieces of presentation data is either of video data, audio data or a combination of video data and audio data;
a preselection control information storage means for storing preselection control information which is used by the digital broadcast receiving apparatus to receive instructions from a viewer concerning preselection of object programs, the preselection control information including: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation;
a multiplexing control means for reading the plurality of pieces of presentation data from the presentation data storage means and the preselection control information corresponding to the plurality of pieces of presentation information from the preselection control information storage means, and multiplexing the read plurality of pieces of presentation data and the read preselection control information into the transport stream during a transmission period which is determined based on a broadcast time of the broadcast program; and
a sending means for sending the transport stream in which the read plurality of pieces of presentation data and the read preselection control information are multiplexed, and the digital broadcast receiving apparatus comprising:

a receiving/extracting means for receiving the transport stream and extracting the plurality of pieces of presentation data and the preselection control information from the received transport stream, wherein the preselection control information includes: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation;
a display processing means for displaying an original image on an external display based on a piece of presentation data being video data extracted by the receiving/extracting means,
a preselection receiving means for receiving a manipulation performed by the viewer; and,
a script interpreting/executing means for executing the second script when the manipulation received by the preselection receiving means matches contents of the first script.

18. A computer-readable recording medium storing a program which allows a computer to function as a digital broadcast receiving apparatus for receiving a transport stream in which a plurality of pieces of presentation data of a broadcast program and preselection control information are multiplexed, wherein each of the plurality of pieces of presentation data is either of video data and audio data, and the preselection control information is used for receiving instructions from a viewer concerning preselection of object programs, the digital broadcast receiving apparatus comprising:

the digital broadcast receiving apparatus comprising:
a receiving/extracting means for receiving the transport stream and extracting the plurality of pieces of presentation data and the preselection control information from the received transport stream, wherein the preselection control information includes: a first script which specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation;
a display processing means for displaying an original image on an external display based on a piece of presentation data being video data extracted by the receiving/extracting means;
a preselection receiving means for receiving a manipulation performed by the viewer; and
a script interpreting/executing means for executing the second script when the manipulation received by the preselection receiving means matches contents of the first script.

19. A digital broadcast sending apparatus which sends a transport stream to a digital broadcast receiving apparatus, comprising:
a presentation data storage means for storing a plurality of pieces of presentation data of a broadcast program, wherein each of the plurality of pieces of presentation data is either of video data, audio data or a combination of video data and audio data;
a preselection control information storage means for storing preselection control information which is used by the digital broadcast receiving apparatus to receive instructions from a viewer concerning preselection of object programs, the preselection control information including: graphics information which includes graphics data to be superimposed on an original image of a piece of presentation data of video data reproduced on a display of the digital broadcast receiving apparatus, the graphics information also specifying an initial display state of the graphics data; object program identification information which is used to identify object programs preselected by the viewer; and a change instruction for instructing to change the initial display state of the graphics data to another display state when a preselection of the object program is complete;
a program schedule information storage means for storing program schedule information which includes information used for identifying the broadcast program, includes broadcast time information of the broadcast program, and shows a relationship between the broadcast program and the preselection control information.
a multiplexing control means for referring to the program schedule information, reading the plurality of pieces of presentation data from the presentation data storage means, and multiplexing the read plurality of pieces of presentation data into the transport stream during a transmission period which is determined based on the broadcast time information, and repeatedly reading the preselection control information specified in the program schedule information from the preselection control information storage means and multiplexing the read preselection control information into the transport stream during the transmission period; and
a sending means for sending the transport stream in which the read plurality of pieces of presentation data and the read preselection control information are multiplexed.

20. The digital broadcast sending apparatus of claim 19, wherein
the preselection control information further includes a script which specifies that when an object program is preselected, a piece of presentation data currently reproduced is changed to another piece of presentation data.

21. The digital broadcast sending apparatus of claim 20, wherein
the preselection control information further includes a manipulation object which is to be superimposed on the original image,
the program identification information includes a piece of manipulation information which corresponds to the manipulation object and specifies a manipulation performed by the viewer to preselect an object program, and
when the viewer performs the manipulation to preselect the object program, the object program is identified through the piece of manipulation information.

22. A digital broadcast receiving apparatus for receiving a transport stream in which a plurality of pieces of presentation data of a broadcast program and preselection control information are multiplexed, wherein each of the plurality of pieces of presentation data is either of video data, audio data or a combination of video data and audio data, and the preselection control information is used for receiving instructions from a viewer concerning preselection of object programs, the digital broadcast receiving apparatus comprising:
a receiving/extracting means for receiving the transport stream and extracting the plurality of pieces of presentation data and the preselection control information from the received transport stream, wherein the preselection control information includes: graphics information which includes graphics data to be superimposed on an original image of a piece of presentation data of video data reproduced on the external display, the graphics information also specifying an initial display state of the graphics data; object program identification information which is used to identify object programs preselected by the viewer; and a change instruction for instructing to change the initial display state of the graphics data to another display state when a preselection of the object program is complete;
a display processing means for displaying the original image on an external display based on a piece of presentation data being video data extracted by the receiving/extracting means;
a preselection judging means for judging whether the viewer has preselected an object program; and
a control means for instructing the display processing means to display the graphics data so that the graphics data is superimposed on the original image based on the change instruction when the preselection judging means judges that the viewer has preselected an object program.

23. The digital broadcast receiving apparatus of claim 22, wherein the preselection control information further includes a script which specifies that when an object program is preselected, a piece of presentation data currently reproduced is changed to another piece of presentation data, the control means includes:

a script interpreting unit for interpreting the script; and a presentation data extraction control unit for instructing the receiving/extracting means to stop extracting a current piece of presentation data and start extracting another piece of presentation data when the preselection judging means judges that the viewer has preselected an object program.

24. The digital broadcast receiving apparatus of claim 23, wherein the preselection control information further specifies a manipulation object which is to be superimposed on the original image, the object program identification information includes a piece or manipulation information which corresponds to the manipulation object and specifies a manipulation performed by the viewer to preselect the object program, and the display processing means superimposes the manipulation object on the original image displayed on the external display, wherein the digital broadcast receiving apparatus further comprises:

a preselection receiving means for recognizing a manipulation performed by the viewer; and a program ID storage means for storing IDs of the object programs identified by the object program identification information.

25. A digital broadcast sending apparatus which sends a transport stream to a digital broadcast receiving apparatus, comprising:

a preselection control information storage means for storing preselection control information which is used by the digital broadcast receiving apparatus to receive instructions from a viewer concerning preselection of object programs, the preselection control information including: a first script which includes a manipulation object and specifies a manipulation of the viewer performed to preselect an object program; and a second script which includes program identification information specifying an object program corresponding to the manipulation specified in the first script and includes an instruction to perform a process of preselecting the specified object program when the viewer performs the manipulation;

a multiplexing control means for reading the preselection control information from the preselection control information storage means and multiplexing the read preselection control information into the transport stream during a transmission period which is determined based on broadcast time of the preselection control information; and a sending means for sending the transport stream in which the read preselection control information is multiplexed.

26. The digital broadcast sending apparatus of claim 25 further comprising:

a presentation data storage means for storing a piece of presentation data of a broadcast program, wherein the piece of presentation data is either of video data and audio data, wherein the multiplexing control means reads the piece of presentation data from the presentation data storage means, and multiplexes the read piece of presentation data into the transport stream during the transmission period.

27. A digital broadcast receiving apparatus for receiving a transport stream in which preselection control information is multiplexed, wherein the preselection control information is used for receiving instructions from a viewer concerning preselection of object programs, the digital broadcast receiving apparatus comprising:

a receiving/extracting means for receiving the transport stream and extracting the preselection control information from the received transport stream, wherein the preselection control information includes: a first script which includes a manipulation object and specifies a manipulation of the viewer performed to preselect an object program; and a second script which includes program identification information specifying the object program corresponding to the manipulation specified in the first script and includes an instruction to perform a process of preselecting the specified object program when the viewer performs the manipulation;

a display processing means for displaying on the external display the manipulation object included in the extracted first script;

a preselection receiving means for receiving a manipulation performed by the viewer; and a script interpreting/executing means for executing the second script when the manipulation received by the preselection receiving means matches contents of the first script.

28. The digital broadcast receiving apparatus of claim 27, wherein presentation data of audio data is multiplexed in the transport stream, the second script further includes an instruction to extract the presentation data when the viewer performs the manipulation, the script interpreting/executing means instructs the receiving/extracting means to extract the presentation data in accordance with the second script, the receiving/extracting means extracts the presentation data in accordance with the instruction by the script interpreting/executing means, and the digital broadcast receiving apparatus further comprises:

an audio processing means for reproducing the presentation data of audio data extracted by the receiving/extracting means.

29. The digital broadcast receiving apparatus of claim 27, wherein presentation data of video data is multiplexed in the transport stream, the second script further includes an instruction to extract the presentation data when the viewer performs the manipulation, the script interpreting/executing means instructs the receiving/extracting means to extract the presentation data in accordance with the second script, the receiving/extracting means extracts the presentation data in accordance with the instruction by the script interpreting/executing means, and the display processing means displays on the external display the presentation data of video data as a background of the manipulation object.

30. The digital broadcast receiving apparatus of claim 27, wherein presentation data of audio data of a broadcast program is multiplexed into the transport stream during a broadcast period of the broadcast program, the receiving/extracting means further extracts the presentation data from the transport stream, and the digital broadcast receiving apparatus further comprises:

an audio data processing means for reproducing the extracted presentation data of audio data during the broadcast period of the broadcast program.

31. The digital broadcast receiving apparatus of claim 27, wherein presentation data of video data of a broadcast program is multiplexed into the transport stream during a broadcast period of the broadcast program, the receiving/extracting means further extracts the presentation data from the transport stream, and the display processing means displays the extracted presentation data of video data during the broadcast period of the broadcast program on the external display as a background image of the manipulation object.

* * * * *